(12) United States Patent
Rossato et al.

(10) Patent No.: US 8,840,339 B2
(45) Date of Patent: Sep. 23, 2014

(54) SOIL REMEDIATION PROCESS

(75) Inventors: Laurence Suzanne Rosa Rossato, Queensland (AU); Michael Monteiro, Queensland (AU); Michael Whittaker, Kensington (AU); Thomas Baumgartl, Queensland (AU); David Doley, Queensland (AU); Alex Pudmenzky, Queensland (AU); Susanne Schmidt, Queensland (AU)

(73) Assignee: The University of Queensland, St. Lucia, Queensland (AU)

( * ) Notice: Subject to any disclaimer, the term of this patent is extended or adjusted under 35 U.S.C. 154(b) by 648 days.

(21) Appl. No.: 13/000,985

(22) PCT Filed: Jun. 23, 2009

(86) PCT No.: PCT/AU2009/000804
§ 371 (c)(1),
(2), (4) Date: Mar. 30, 2011

(87) PCT Pub. No.: WO2009/155643
PCT Pub. Date: Dec. 30, 2009

(65) Prior Publication Data
US 2011/0182670 A1    Jul. 28, 2011

(30) Foreign Application Priority Data
Jun. 23, 2008  (AU) ................................ 2008903191

(51) Int. Cl.
*B09C 1/00* (2006.01)
*B09C 1/10* (2006.01)
*B09C 1/08* (2006.01)

(52) U.S. Cl.
CPC .. *B09C 1/08* (2013.01); *B09C 1/105* (2013.01)
USPC ................................... 405/128.1; 405/128.5

(58) Field of Classification Search
USPC ........................................... 405/128.1, 128.5
See application file for complete search history.

(56) References Cited

U.S. PATENT DOCUMENTS

| 4,743,288 | A | 5/1988 | Hirsbrunner |
| 5,997,748 | A * | 12/1999 | Rosenberg et al. ........... 210/688 |
| 6,383,128 | B1 | 5/2002 | Pierzynski et al. |
| 6,560,920 | B1 | 5/2003 | Serkiz et al. |
| 2003/0140670 | A1 | 7/2003 | Leggo |
| 2003/0176396 | A1 * | 9/2003 | Shea et al. ...................... 514/63 |
| 2008/0071130 | A1 | 3/2008 | Tamura et al. |
| 2008/0197073 | A1 * | 8/2008 | Jacquet ......................... 210/602 |

FOREIGN PATENT DOCUMENTS

JP    2004290820 A  *  10/2004  ............... B09C 1/10

OTHER PUBLICATIONS

Translation of JP 2004290820a.*

* cited by examiner

Primary Examiner — John Kreck
(74) Attorney, Agent, or Firm — Sughrue Mion, PLLC

(57) ABSTRACT

The invention provides a process for remediation of sites contaminated with metals such as former industrial sites and mines. In particular the invention provides a process for site remediation comprising the steps of:
(a) adding metal-binding particles to a site containing one or more metal contaminants such that at least some of the one or metal contaminants are sequestered by the particles, and
(b) populating the site with plants.

The use of the particles of the present invention in association with plants, and microbiota associated with the plant roots can achieve sustainable phytostabilization of contaminated sites.

12 Claims, 7 Drawing Sheets

SOIL REMEDIATION PROCESS

CROSS REFERENCE TO RELATED APPLICATIONS

This application is a National Stage of International Application No. PCT/AU2009/000804 filed Jun. 23, 2009, which claims priority from Australian Patent Application No. 2008903191 filed Jun. 23, 2008, the contents of all of which are incorporated herein by reference in their entirety.

FIELD OF THE INVENTION

The invention relates to a process for soil remediation using metal-binding hydrogel particles in association with metallophyte plants to achieve sustainable phytostabilisation of contaminated sites.

BACKGROUND OF THE INVENTION

In this specification where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

While the process of the present invention is described with specific reference to sites contaminated by mining it will be appreciated that the process is not so limited in its application but can be used for any site having soil contaminated by one or more metals. Furthermore, the process of the present invention is not limited to the metallophyte plant species mentioned herein but can utilise any metallophyte plants that are known or that become apparent in the future, provided they are otherwise suited to the relevant site.

Elevated levels of metals within landscapes, particularly heavy metals such as cadmium, copper, mercury, manganese, lead, nickel, zinc, cobalt, uranium and the metalloid arsenic are often an unavoidable consequence of mining and other industrial activities. Sites contaminated with heavy metals are frequently problematic for the re-establishment of a sustainable vegetation cover and are prone to erosion, leading to a high risk of contaminant dispersion into adjacent areas, despite the many approaches that have been used to address heavy metal contamination and/or excessive costs involved. It is recognised that chronic exposure to these toxic elements is responsible for many serious human conditions such as cancers and degenerative diseases (Lasat, 2000; Tu et al., 2000; Dahmani-Muller et al., 2001; Khan, 2001; Qiao and Luo, 2001; McGrath et al., 2002; Wu et al., 2004).

Phytoremediation

Among the promising methods that developed nations are increasingly using for treating contaminated landscapes is phytoremediation (Ebbs and Kochian, 1997; Huang et al., 1997; Blaylock, 2000) which involves use of plants and microbiota associated with the roots to remove, contain, or render environmental contaminants harmless (Kirkpatrick et al., 2006). It is currently the best, most cost-effective, low-maintenance and publicly most accepted remediation technique to prevent adverse environmental impacts of former mine sites, (i.e. for large scale mine dumps) (Ghosh and Singh, 2005) but its success is limited due to heavy metal toxicity. Phytoremediation offers a natural solution for the recovery of contaminated sites while simultaneously providing soil surface stabilisation and erosion control. Recent studies in Australia have also shown that metal-adapted plant species (metallophytes) used for phytoremediation are able to ameliorate the toxic environment around their roots by rapidly reducing the pool of water-soluble heavy metals in the soil, allowing the concurrent establishment of less tolerant species (i.e. subsequent natural succession of plant communities) (Whiting et al., 2001). In Europe, the use of metal tolerant plant populations (mostly grasses) to stabilize and revegetate waste is well known. In particular, the use of ecotypes of temperate grasses is a proven technology for stabilizing medium toxicity mine tailings, wastes and sites contaminated by industry (Tordoff et al., 2000). There are many thousand metal tolerant, non-accumulating plant species that might be considered for phytostabilisation (Prasad and Freitas, 2003). All these species restrict the transfer of metals from the soil to their shoots, which reduces the entry of metals into the food chain (Baker, 1981; Massoura et al., 2004).

In Australia, less than 5% of the 110,000 heavy metal contaminated sites have been cleaned up with phytoremediation or other bioremediation techniques. The estimate of more than 110,000 polluted sites in Australia is probably doubled if former arsenic sheep dips are included in the tally (Commonwealth Scientific and Industrial Research Organisation Sustainability Network, 2004). Currently, 80-90% of these contaminated sites are dealt with by expensive excavation of soil and storage of the soil elsewhere. Around 10% of sites are sealed under a layer of concrete, and another 5-10% addressed through soil stabilisation. Less than 5% are cleaned up with bioremediation or other methods. A frequent condition of heavy metal contaminated soils is also a lack of effective vegetation cover, making these soils prone to erosion and therefore with a high risk for distribution into adjacent areas. The potential contamination of drinking water resources, the food chain and air poses threats to both ecosystem and human health. This potential contamination is particularly threatening at those sites under the influence of weather extremes and those situated in or connected to areas of high conservation significance such as Kakadu National Park and the Great Barrier Reef in Australia. The clean-up of metal-polluted soils associated with high environmental risk is thus of highest interest economically as well as for protection of human and environmental health.

Surprisingly, there has been limited research on the use of Australian native plants for phytostabilisation purposes. This is despite (i) Australia being the second most plant biodiverse country in the world (25,000 native species out of a total of 250,000 plant species globally) and (ii) the high level of mining activity in Australia.

Clean up of contaminated sites associated with high environmental risk is still of high priority as these sites pose threats to both ecosystems and human health. Accordingly there is a clear need for a viable technique to decontaminate heavy metals from landscapes and assist native plant establishment even under harsh conditions.

SUMMARY OF THE INVENTION

The present invention provides a process for metal-binding particles for metal remediation purposes at contaminated sites and in mine tailings. In particular the particles of the present invention can be used in association with plants and microbiota associated with the roots to achieve sustainable phytostabilisation of contaminated sites.

The present invention therefore provides a process for site remediation comprising the steps of:

(a) adding metal-binding particles to a site containing one or more metal contaminants such that at least some of the one or metal contaminants are sequestered by the particles, and
(b) populating the site with plants.

In a particularly preferred embodiment the present invention provides a process for site remediation comprising the steps of:
(a) adding metal-binding particles to a site containing one or more metal contaminants such that at least some of the one or more metal contaminants are sequestered by the particles, and
(b) populating the site with metallophyte plants,
wherein the metal-binding particles are capable of releasing stored water for uptake by the plants.

The particles may be of any size appropriate to the process and conditions. In a preferred embodiment, the particles are microparticles or nanoparticles. Nanotechnology may be particularly suitable for the process of the present invention because it offers a novel approach to heavy metal remediation through the design of revolutionary nano-scaled structures that selectively bind irreversibly to heavy metals and enable heavily impacted sites to support plant growth.

The particle may be in the form of a film, latex or sheet. As used herein the term "particle" or "particulate" refers to a body having finite mass and internal structure but negligible dimensions. Typically a particle is an aggregation of sufficiently many atoms or molecules that it can be assigned macroscopic properties such as volume, density, pressure, and temperature.

As used herein the term "remediation" refers to the process of reducing, isolating, or removing contamination from a contaminated site with the purpose of mitigating or minimising the damage to animal health or the environment.

The subject of remediation may be any known metal, but typically it will be a 'heavy metal' or transition metal. The metal will typically have been introduced to the site as a result of mining or another industrial process such as smelting, tanning or paint production. As used herein the term "heavy metal" refers to metallic elements with high atomic weights, e.g., mercury, chromium, cadmium, arsenic, silver, gold, uranium and lead. In particular, a heavy metal is a metal whose specific gravity is approximately 5.0 or higher than that of water. As used herein a "heavy metal ion" refers to an elementary heavy metal particle or system of elementary heavy metal particles with a net electric charge. Non-limiting examples of heavy metals include vanadium, cobalt, chromium, iron, arsenic, germanium, molybdenum, gold, antimony, tin, bismuth, zinc, copper, tungsten, rhenium, uranium, selenium, nickel, lead, mercury, cadmium, silver, manganese, palladium and platinum. The term heavy metal ion is taken to include heavy metal ion complexes.

Preferably the particle is a nanoparticle, that is, a particle whose average diameter is typically from about 1- about 1000 nanometers. The most obvious advantage that nanostructured materials provide for environmental remediation is that they offer very high specific surface areas (measured in square meters per gram) (Banfield and Zhang, 2001; Fryxell and Mattigod, 2006).

To establish a sustainable plant cover, sites that are heavily impacted by heavy metal contaminants require improvement prior to revegetation. In a particularly preferred embodiment of the present invention, the particles are designer hydrogel particles which have the capacity to both detoxify metals from soil (and water) and to provide a source of water for plants during establishment, particularly in drought conditions. Hydrogel particles have great potential to highly improve the efficiency of any restoration operation by: (i) allowing the establishment of selected plants in environmental extremes (such as high concentration of heavy metals and drought) and (ii) acting in synergy with the selected plant species to sequestrate heavy metals to achieve sustainable phytostabilisation of contaminated sites and subsequently reduce the risks of uncontrolled metal transfers into the environment.

The Plant Species

The plants used to populate the site may be of any suitable type. Preferably the plants will be native to the geographical location of the site. For example, the plants or their biomass (including bacteria associated with the roots) may be Thetallophytes', that is, plants that can tolerate substrates such as soil or sediment, that have high levels of metals.

Australia has a natural, untapped biodiversity of metallophyte plants. These include for example, native grass species *Triodia pungens* (spinifex) and *Astrebla lappacea* (curly Mitchell grass) which are found in many outback mining areas where soil contamination is common. *Astrebla lappacea* is a tussocky perennial grass that is extremely drought tolerant due to its robust root system. *Triodia pungens* is particularly preferred for rehabilitation in arid regions of Queensland.

Perennial grasses give stability to the soil surface, as their fibrous root systems hold the soil together very effectively. The mass of leaves and stems of the tussock grasses reduce wind velocity at the soil surface, intercept raindrops and reduce the velocity of water flowing over the soil surface. They are also useful for phytostabilisation of contaminated soils because of their ability to take up heavy metals and then store them in the root structure. This characteristic makes them suitable for cattle/animal grazing.

Grasses, trees and shrubs are commonly used for phytostabilisation. Grasses offer a rapid ground cover and reduce wind and water erosion over the short and long term. Shrubs and trees offer a broad canopy cover and establish more extensive and deeper root systems that prevent erosion over the long term. Metallophyte plants have a particularly high tolerance or unique tolerance profile for specific metal species. For example European natives *Arabidopsis halleri* and *Thlaspi caerulescens* are favoured for phytoremediation in areas contaminated by Zn or Cd. Accordingly, the process of the present invention may be optimised by selecting metallophyte plants that have a particularly high tolerance for the metal species at a particular site. One or more metallophyte plant species may be used in the process of the present invention.

Without wishing to be bound by theory, it is assume that the ligands on the hydrogel particles bind irreversibly to metals in the site soil, decreasing the metal bioavailability to plants. The high affinity of the hydrogel for water means that a large proportion of the weight of each particle comprises water. During dry or drought periods, the bound water is released from the hydrogel and becomes available to the plant, supporting revegetation. Over time, the particles degrade and release the heavy metals, which are thus diluted in the plant root biomass and bound by soil organic matter, thus leading to sustainable soil phytostabilisation.

Adding Particles

The particles may be added to the site by any convenient means. Preferably the particles are worked into the soil to some depth. This can be achieved by any convenient means such as ploughing, or using a slurry or suspension of particles that is applied to the site surface and soaks through the soil to a desired depth.

The particles can be added to the site in conjunction with the plants or plant germinal material (such as seeds or spores), or added independently of the plants or their germinal material. For example, each particle may comprise one or more plant seeds or spores. For example, the composition of the particle may be coated onto the seeds or spores.

Nature of the Particles

As mentioned previously the particles may be of any suitable size, from nanosize or microsize to macrosize. However there may be considerable advantages associated with the use of very small particles in terms of their surface to volume ratio. For example nanoparticles or microparticles suitable for the process of the current invention can draw on recent advances in the production of unique microparticle and nanoparticles materials that are able to effectively and intelligently remove a variety of contaminants from soil, air and water. Already, nanofilters can remove bacteria and other microscale particulates from air and water, while other engineered nanostructures with specific properties are able to selectively remove ions and other contaminants from air and water. Inorganic nanoparticles (Wilson, 2002), which are highly reactive due to their high surface area to volume ratio, can foster the degradation of contaminants in water, soil and air. Engineered polymeric nanoparticles or microparticles however, can be designed to be more stable than their inorganic counterparts which can enhance their effectiveness in the harsh soil environment. Recently, engineered polymeric nanoparticles have been specifically designed and successfully synthesized to address the problem of hydrophobic contamination of groundwater and polymer/inorganic composite nanoparticles have proven very effective in removing chlorinated contaminants from groundwater (Tungittiplakorn et al., 2004; Saleh et al., 2005; Tungittiplakorn et al., 2005). Several examples exist in which polymeric nanoparticles have been specially designed for heavy metal sequestration for water remediation (Kesenci et al., 2002; Say et al., 2002a; Say et al., 2002b; Kara et al., 2004; Uzun et al., 2006). In these examples, particles typically require the use of a specifically designed and synthesized polymerisable ligand which is time consuming and greatly increases the cost. However, recently emulsion techniques have been shown to be suitable for the large scale, cost effective, synthesis of smart polymeric nanoparticles that are able to specifically sequester heavy metals (Bell et al., 2006).

Preferred Composition of the Particles

Preferably the particles for use in the process of the present invention are hydrogel particles, more preferably crosslinked hydrogel particles that are capable for irreversible metal sequestering and storage and release of water. The hydrogel material incorporates metal-binding ligands. Hydrogels are polymeric materials having a distinct three-dimensional structure and a high binding affinity for water. Traditional methods of synthesis include crosslinking copolymerization, crosslinking of reactive polymer precursors, and crosslinking via polymer-polymer reaction.

For example, the particles may comprise amide monomers (such as dimethyl acrylamide and bisacrylamide monomers or polydimethylacrylamide) copolymerised to form polyacrylamide chains; the chains are crosslinked may be carried out using any suitable reaction such as emulsion polymerization. In particular, methods such as Reversible Addition Fragment chain Transfer polymerisation (RAFT) can be used to tailor the properties of the polymer. The RAFT process comprises performing polymerization in the presence of certain dithio agents such as xanthates or dithioesters. Tetra-thiols could also be used. The RAFT agent can be hydrolysed to form thiol ligands which are known to bind irreversibly to a wide range of metals.

The water delivery and heavy metal binding properties of these types of particles can be controlled by manipulation of the emulsion process: (i) particle size can be predetermined by changing the method of preparation (Mathur et al., 1996), (ii) water retention and mechanical properties can be manipulated by the incorporation of other less hydrophilic monomers (e.g. styrene, methylacrylate, methyl methacrylate) or through changing the amount or identity of the crosslinker, and (iii) the metal binding capacity can be controlled by the incorporation of RAFT-agent (Bell et al., 2006), followed by hydrolysis to thiol end-group ligands. Cage ligands can be attached to bind to specific metals (Say et al., 2002(a),(b); Bell et al., 2006).

The physical size of the particles may be controlled by their method of synthesis. Alternatively, the physical size of the particles can be reduced, for example to micro or nano size, by physical means such as a ball-mill.

In a particularly preferred embodiment, the particles of the present invention are comprised of a polymer having a surface that comprises pendant sulphur-containing moieties $M^1$ that are capable of binding a metal, particularly a heavy metal, to form a complex comprising the polymer and the metal. Typically the pendant moieties $M^1$ may be selected from thioketones, thiocarbonates, dithiocarbonates, trithiocarbonates, thioesters, dithioates, thioates, oxythiocarbonyl and thiocarbonyloxy derivatives, thiocarbamates, dithiocarbamates, sulphides, thiols, thioethers, disulphides, hydrogendisulphides, mono- or di-thioacetals, mono- or dithiohemiacetals, thioamides, thioimides, imidothioates, thioguanidines, dithioguanidines, thiocyanates, isothiocyanates, sulphur containing macrocycles and optionally substituted sulphur containing heterocycles.

The pendant moieties $M^1$ may be present as part of a heterocyclic or carbocyclic ring. Suitable sulphur functional groups that are part of a cyclic system include cyclic thioketones, cyclic thiocarbonates, cyclic dithiocarbonates, cyclic trithiocarbonates, cyclic thiolacetone, cyclic dithiolacetones, cyclic thioates, cyclic sulphides, cyclic thioethers, cyclic disulphides, cyclic mono- or dithioacetals, cyclic thioamides, cyclic thioimides, cyclic imidothioates, cyclic thioguanidines and cyclic dithioguanidines.

Suitably, the sulphur-containing moiety $M^1$ may be present as a substituent of a carbocyclic or heterocyclic ring.

In some embodiments, the sulphur-containing surface-pendant heavy metal binding moiety $M^1$ is selected from Formula I:

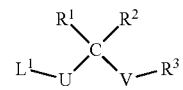

wherein:
$L^1$ is a linking group to the polymer;
U is absent or present and is oxygen, sulphur or —$NR^4$—;
V is absent or present and is selected from H, oxygen, sulphur or —$NR^4$—; and
C is absent or present and represents a carbon atom, provided that C is only absent when both U and V are sulphur or when V is hydrogen;
$R^1$ and $R^2$ are independently selected from hydrogen, cyano, halo, hydroxy, $C_{1-6}$alkoxy, $C_{1-6}$acyloxy, mercapto, amino, nitrile, nitro, nitroso, optionally substituted $C_{1-8}$alkyl, optionally substituted $C_{1-8}$alkenyl, optionally substituted $C_{1-8}$alkynyl, optionally substituted $C_{1-4}$alkylaryl, and optionally substituted aryl;
$R^1$ and $R^2$ combine with C to form C=S, C=N—$R^N$, or C=O, wherein $R^N$ is hydrogen, hydroxy, amino, optionally substituted C$_{1-8}$alkyl, optionally substituted C$_{1-8}$alkenyl, optionally substituted C$_{1-8}$alkynyl, optionally substituted C$_{1-4}$alkylaryl, and optionally substituted aryl; or R$^1$ and R$^2$ combine to form an optionally substituted 1,3-dithiane or 1,3 dithiolane;

R$^3$ is absent when V is a hydrogen atom and is selected from hydrogen, optionally substituted C$_{1-8}$ alkyl, optionally substituted C$_{2-8}$ alkenyl, optionally substituted C$_{2-8}$ alkynyl, optionally substituted C$_{1-4}$ alkylaryl, optionally substituted heterocycloalkyl, optionally substituted heteroaryl and optionally substituted aryl; and R$^4$ is selected from hydrogen, hydroxy, amino, optionally substituted C$_{1-8}$alkyl, optionally substituted C$_{1-8}$alkenyl, optionally substituted C$_{1-8}$alkynyl, optionally substituted C$_{1-4}$ alkylaryl, and optionally substituted aryl;

provided that at least one of U, V or the combination of R$^1$ and R$^2$ contains a sulphur atom.

In some embodiments, the linking group L$^1$ is of Formula II:

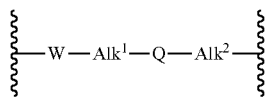

wherein:

W is absent or present and is selected from >NR$^G$, —NHC(O)—, —C(O)NH—, —S—, or —O—, wherein R$^G$ is hydrogen, optionally substituted C$_{1-6}$alkyl, optionally substituted arylC$_{1-4}$alkyl, optionally substituted aryl or optionally substituted heteroaryl;

Alk$^1$ is absent or present and is selected from an optionally substituted divalent C$_{1-4}$ alkyl, optionally substituted divalent C$_{2-5}$ alkenyl and optionally substituted divalent C$_{2-5}$ alkynyl chain, optionally substituted divalent aryl, optionally substituted divalent heteroaryl, optionally substituted divalent C$_{1-4}$ alkylaryl, and optionally substituted divalent arylC$_{1-4}$ alkyl, with the proviso that both W and Q are not simultaneously present when Alk$^1$ is absent;

Alk$^2$ is absent or present and is selected from optionally substituted divalent C$_{1-4}$ alkyl, optionally substituted divalent C$_{2-5}$ alkenyl, optionally substituted divalent C$_{2-5}$ alkynyl chain, optionally substituted divalent aryl, optionally substituted divalent heteroaryl, optionally substituted divalent C$_{1-4}$ alkylaryl, and optionally substituted divalent arylC$_{1-4}$ alkyl;

Q is absent or present and is selected from —NH—, —O—, —S—, —NHC(O)—, —C(O)NH—, NHSO$_2$—, —C(R$^G$)=N—N—, —NHC(O)NH—, —NHC(S)NH—, —C(R$^G$)=N—, and —N=C(R$^G$)—; and when all of Alk$^1$, Alk$^2$, W, and Q are absent, L$^1$ is a covalent linkage.

In some embodiments, the pendant sulphur-containing moiety M$^1$ is selected from:

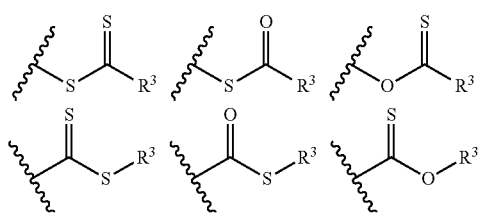

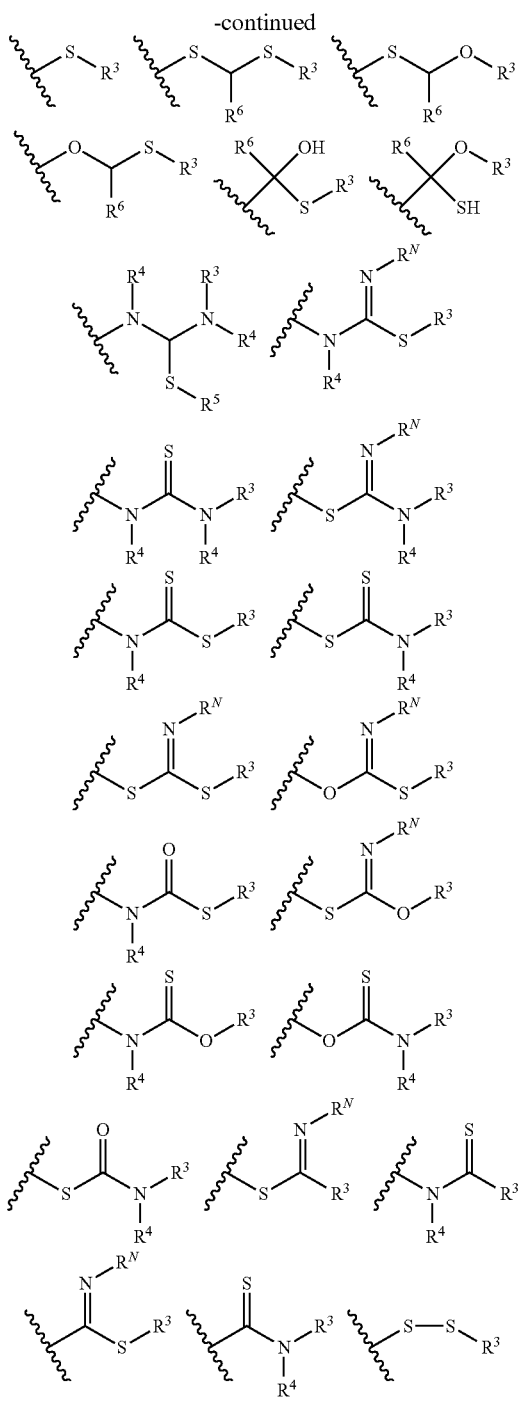

wherein R$^3$, R$^4$, and R$^N$ are defined as above;

R$^5$ is the same as R$^3$; and

R$^6$ is selected from hydrogen, cyano, halo, hydroxy, C$_{1-6}$alkoxy, C$_{1-6}$acyloxy, mercapto, amino, nitrile, nitro, nitroso, optionally substituted C$_{1-8}$alkyl, optionally substituted C$_{1-8}$alkenyl, optionally substituted C$_{1-8}$alkynyl, optionally substituted C$_{1-4}$alkylaryl, and optionally substituted aryl.

In some embodiments, the polymer surface further comprises a carbonyl containing moiety M$^2$.

The carbonyl-containing moiety M$^2$ may be selected from ketones, di and tri-ketones, hydroxy-ketones, vinyl ketones, esters, keto-esters including β-ketoesters, aldehydes, carbonates, anhydrides, carbamates, amides, imides (diacylamines), triacylamides, hydrazides, isocyanates and ureas.

The moiety $M^2$ may be present in the form of a heterocyclic or carbocyclic ring system. Suitable, carbonyl functional groups that are part of a cyclic system include cyclic ketones, lactones, β-diketones, cyclic carbonates, cyclic carbamates, cyclic amides, cyclic diacyl amines or cyclic anhydrides.

Suitably, the carbonyl-containing moiety $M^2$ may be present as a substituent of a carbocyclic or heterocyclic ring.

In some embodiments the polymer surface comprises a sulphur-containing moiety $M^1$ selected from a xanthate and a carbonyl-containing moiety $M^2$ selected from a keto functionality.

In specific embodiments, the polymer surface comprises a sulphur-containing $M^1$ selected from a xanthate and a carbonyl-containing moiety $M^2$ selected from a beta-keto ester.

In some embodiments, the polymer surface comprises one or more heavy metal-binding moieties $M^1$ wherein at least one heavy metal binding moiety is selected from Formula III:

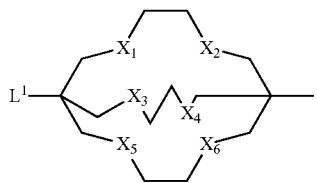

wherein $X_1$ to $X_6$ are independently selected from sulphur or —NH— provided that at least one of $X_1$ to $X_6$ is a sulphur atom; and
$L^1$ is defined as above.

In some embodiments, the polymer surface comprises a xanthate moiety, a keto functionality, and a moiety of formula III.

In further embodiments, the polymer surface comprises a xanthate moiety, a beta-keto ester functionality, and a moiety of formula III.

In still further embodiments, the polymer surface comprises a xanthate moiety, a beta-keto ester functionality, and a moiety of formula III wherein $X_1$, $X_3$ and $X_5$ are —NH— and $X_2$, $X_4$ and $X_6$ are sulphur, and $L^1$ is an imine.

In some embodiments, the polymer surface comprises a xanthate functionality and a moiety of formula III.

Unless defined otherwise, all technical and scientific terms used herein have the same meaning as commonly understood by those of ordinary skill in the art to which the invention belongs. Although any methods and materials similar or equivalent to those described herein can be used in the practice or testing of the present invention, preferred methods and materials are described. For the purposes of the present invention, the following terms are defined below.

There is a diverse range of synthetic polymers known to those skilled in the art. The kind and structure of polymer synthesised depends on many factors including the kind and number of monomers used, the polymerisation method, polymerisation conditions, and the various co-factors used at the beginning, during and at the end of the polymerisation process. Illustrative examples of types of polymers include: "homo-polymers" which refers to polymers comprised of macromolecules constructed of identical monomers; "chain polymers" a kind of homo-polymer which the repetition of units is linear—a chain polymer consists of macromolecular chains with identical bonding linkages to each monomer unit which may be represented as: -[A-A-A-A-A-A]-, wherein "A" represents a monomeric unit; "branched polymers" which are polymers comprised of macromolecules with one or more chemical side chains extending from the main backbone or chain of the macromolecule; "star-branching polymers" which are polymers comprised of branch macromolecules wherein the branches ultimately emanate from a single point; "dendrimers" which are branched macromolecules with a high degree of branching—typically the branches of these molecules have branches themselves; "block polymers" which are polymers comprised of macromolecules composed of two or more connected blocks—in the simplest case, the XY diblock consists of two blocks, X and Y, joined together; "copolymers" which are polymers comprised of macromolecules derived from more than one species of monomer—polymers comprised of macromolecules having monomeric units differing in constitutional or configurational features but derived from a single monomer, are not regarded as copolymers; "graft copolymers" which are polymer comprised of macromolecules with one or more species of block connected to the main chain as side chains. These side chains having constitutional or configurational features that differ from those in the main chain. In a graft copolymer, the distinguishing feature of the macromolecular side chains is constitutional, i.e., the side chains comprise units derived from at least one species of monomer different from those which supply the units of the main chain; "statistical copolymers" which are copolymers comprised of macromolecules in which the sequential distribution of the monomeric units obeys known statistical laws; e.g., the monomer sequence distribution may follow Markovian statistics of zeroth (Bernoullian), first, second, or a higher order; "random copolymers" which are special case of a statistical copolymers—it is a statistical copolymer comprised of macromolecules in which the probability of finding a given monomeric unit at any given site in the chain is independent of the nature of the neighbouring units at that position (Bernoullian distribution); "alternating copolymers" which are copolymers comprised of macromolecules further comprising two species of monomeric units distributed in alternating sequence, for example the arrangement -ABABABAB- or (AB) represents an alternating macromolecule; "periodic copolymers" which are copolymers comprising macromolecules where the monomeric units appear in an ordered sequence, for example -[ABC-ABC-ABC]—, wherein "A", "B" and "C" represent different monomeric units.

A "block copolymer" refers to a polymer comprised of macromolecules which are further comprised of at least two constitutional sequences; having any one of a number of different architectures, where the monomers are not incorporated into the macromolecule architecture in a solely statistical or uncontrolled manner. Although there may be three, four or more monomers in a single block-type macromolecule architecture, the polymer will still be referred to herein as a block copolymer. In some embodiments, the constitutional sequences of the block copolymer will have an A-B architecture (with "A" and "B" representing the). Other architectures included within the definition of block copolymer include A-B-A, A-B-A-B, A-B—C, A-B—C-A, A-B—C-A-B, A-B—C—B, A-B-A-C (with "C" representing a third monomer), and other combinations that will be obvious to those of skill in the art.

In addition, it is possible to prepare polymer blends. Polymer blends span the entire range from fully miscible to completely immiscible. The thermodynamic drive towards phase separation increases with increasing inherent incompatibility and as with increasing average molecular weights of polymer chains. Unlike, for example, block copolymers where highly ordered morphologies are found, one does not normally find ordered arrangements of regularly-shaped domains in a blend since the polymer chains of different blend components are not bonded to each other. The blend morphology can be affected significantly by many factors known to those skilled in the art.

Of particular importance is the surface functionalised nature of the polymers of the present invention. As used herein the term "surface functionalised" in relation to polymers, refers to a polymer, the surface of which has pendant functional groups, or has been functionalised to have pendant functional groups. As used herein the term "surface" when applied to a polymer, for example referring to the "polymer surface" or "surface of a polymer", refers to the surface area of a polymeric material including any pores and channels that form a continuous part of the surface area. As used herein the term "functional group" refers to a chemical moiety, such as an atom or group of atoms, in an organic compound that gives the compound some of its characteristic properties. As used herein the term "surface functional groups" refers to the functional groups that are pendant from the polymer surface. As used herein a "pendant group", refers to a chemical offshoot, such as a functional group, that is neither oligomeric nor polymeric from a chain or backbone. As used herein the term "backbone" refers to the main structure of a polymer onto which substituents are attached. _As used herein a "substituent" refers to a functional group on a molecule. _As used herein a "substituent" when used in relation to polymers, refers to a functional group such as a linker or a surface functional group on a macromolecule. Typically, a substituent, such as a functional group or linker, is substituted in place of a hydrogen atom on a parent chain.

Surface functionalised polymers can be prepared in a variety of ways. By way of illustration, a polymer may have an appropriately functionalised surface resulting from the polymerisation process employed. For example, preparation of a styrene based polymer by the RAFT process using a xanthate control agent and styrene may provide a resulting surface functionalised polymer (Y) by virtue of the xanthate end groups on individual macromolecules. As used herein the term "end group", refers to the chain-terminating functional group of a macromolecule. Further, reaction of the styrene polymer so formed with another monomer under the appropriate polymerisation conditions to form a block copolymer, can introduce a second functional group to the polymer. For example, use of 2-(acetoacetoxy)ethyl methacrylate (AAEMA) as the second monomer, will introduce a carbonyl functional groups to afford a di-functionalised polymer (Z) having both carbonyl and xanthate functions on its surface.

Alternatively, a prepared polymer such as polymer (Z) may have its surface suitably functionalised after the polymer has been synthesised. For example, the carbonyl functions can be reacted with primary amines derivatives to form imines (Schift base formation) thereby introducing further functionalisation to the polymer through a post polymerisation surface modification. The amine derivative may be further desirably functionalised with heavy metal binding groups. As used herein the term "heavy metal binding group" refers to a functional group that binds heavy metals. According to the methods of the present invention, the heavy metal binding group is a sulphur-containing heavy metal binding group. By way of another illustrative example, polymer (Z) as described above can be hydrolysed in the presence of a secondary amine such as piperidine, to afford a polymer with thiol surface functionalisation. As used herein the term "surface functionalisation" when used in relation to a polymer surface, may variously refer to the functionalised surface of the polymer, the process of adding functional groups to the polymer surface, or modifying functional groups present on the polymer surface, in order to obtain desired functional groups on the polymer surface.

Similarly, a polymer with halogen surface functionalisation such as bromo-functionalisation, can be reacted with a di- or tri-thiocarbonyl salt, to form a xanthate or trithiocarbonatesurface functionalised polymer.

As used herein, the term "$C_{1-6}$alkyl", as used alone or as part of a group such as "di($C_{1-6}$alkyl)amino", refers to straight chain, branched or cyclic alkyl groups having from 1 to 6 carbon atoms. _Examples of such alkyl groups include methyl, ethyl, n-propyl, isopropyl, n-butyl, cyclopentyl and cyclohexyl. Similarly, $C_{1-4}$, $C_{1-8}$ and $C_{1-10}$ alkyl, for example, refer to groups having 1 to 4, 1 to 8, and 1 to 10 carbon atoms, respectively.

As used herein, the term "halo", as used alone or as part of a group such as "$C_{3-6}$halo alkenyl", refers to fluoro, chloro, bromo and iodo groups.

The terms "$C_{1-6}$alkoxy" and "$C_{1-6}$alkyloxy" as used herein, refer to straight chain or branched alkoxy groups having from 1 to 6 carbon atoms. Examples of $C_{1-6}$alkoxy include methoxy, ethoxy, n-propoxy, isopropoxy, cyclohexyloxy, and the different butoxy isomers. Similarly, $C_{1-4}$, $C_{1-8}$ and $C_{1-10}$ alkoxy refer to groups having 1 to 4, 1 to 8, and 1 to 10 carbon atoms, respectively.

As used herein, the term "aryloxy" refers to an "aryl" group attached through an oxygen bridge. Examples of aryloxy substituents include phenoxy, biphenyloxy, naphthyloxy and the like.

The term "aryl$C_{1-4}$ alkyloxy" as used herein, refers to an "aryl$C_{1-4}$alkyl" group attached through an oxygen bridge. Examples of "aryl$C_{1-4}$alkyloxy" groups are benzyloxy, phenethyloxy, naphthylmethyleneoxy, biphenylmethyleneoxy and the like.

The term "$C_{1-10}$ acyl" as used herein, refers to straight chain or branched, aromatic or aliphatic, saturated or unsaturated acyl groups having from 1 to 10 carbon atoms. Examples of $C_{1-10}$acyl include formyl, acetyl, propionyl, butanoyl, pentanoyl, pivaloyl, benzoyl and 2-phenylacetyl, Similarly, $C_{1-4}$, $C_{1-6}$ and $C_{1-8}$ acyl refer to groups having 1 to 4, 1 to 6, and 1 to 8 carbon atoms, respectively.

As used herein, the term "$C_{1-6}$ alkyloxycarbonyl" refers to an —$C_{1-6}$alkyloxy" group attached through a carbonyl group. Examples of "$C_{1-6}$alkyloxycarbonyl" groups include methylformate, ethylformate, cyclopentylformate and the like.

The term "$C_{2-8}$ alkenyl" as used herein, refers to groups formed from $C_{2-8}$ straight chain, branched or cyclic alkenes. Examples of $C_{2-8}$alkenyl include allyl, 1-methylvinyl, butenyl, iso-butenyl, 3-methyl-2-butenyl, 1-pentenyl, cyclopentenyl, 1-methyl-cyclopentenyl, 1-hexenyl, 3-hexenyl, cyclohexenyl, 1,3-butadienyl, 1-4,pentadienyl, 1,3-cyclopentadienyl, 1,3-hexadienyl, 1,4-hexadienyl, 1,3-cyclohexadienyl and 1,4-cyclohexadienyl. Similarly, $C_{2-4}$, $C_{2-6}$ and $C_{2-10}$ alkenyl, for example, refer to groups having 2 to 4, 2 to 6, and 2 to 10 carbon atoms, respectively.

As used herein, the term "$C_{2-8}$ alkynyl" refers to groups formed from $C_{2-8}$ straight chain or branched groups as previously defined which contain a triple bond. Examples of $C_{2-8}$alkynyl include 2,3-propynyl and 2,3- or 3,4-butynyl. Similarly, $C_{2-4}$, $C_{2-6}$ and $C_{2-10}$ alkynyl, for example, refer to groups having 2 to 4, 2 to 6, and 2 to 10 carbon atoms, respectively.

As used herein, the term "aryl$C_{1-4}$ alkyl" refers to groups formed from $C_{1-4}$ straight chain, branched alkanes substituted with an aromatic ring. Examples of arylC$_{1-4}$alkyl include methylphenyl (benzyl), ethylphenyl, propylphenyl and isopropylphenyl.

By "optionally substituted" it is meant that a group may include one or more substituents that do not interfere with the heavy metal binding activity of the compound of formula I. In particular, they do not bind to metals that are not heavy metals such as sodium, potassium and calcium. In some instances, the substituent may be selected to improve certain physicochemical properties of the polymer such as solubility in organic and aqueous media. Examples of optional substituents include halo, C$_{1-4}$alkyl, C$_{2-4}$alkenyl, C$_{2-4}$alkynyl, C$_{1-4}$alkoxy, haloC$_{1-4}$alkyl, hydroxyC$_{1-4}$alkyl, C$_{1-7}$alkoxy, C$_{1-7}$acyloxy, hydroxy, aryl, amino, azido, nitro, nitroso, cyano, carbamoyl, trifluoromethyl, mercapto, C$_{1-4}$alkylamino, C$_{1-4}$dialkylamino, aryloxy, formyl, carbamoyl, C$_{1-6}$alkylsulphonyl, C$_{1-6}$arylsulphonyl, C$_{1-6}$alkylsulphonamido, C$_{1-6}$arylsulphonamido, C$_{1-4}$alkylamino, di(C$_{1-4}$alkyl)amino, —NR$^{10}$R$^{11}$ and C$_{1-4}$alkoxycarbonyl.

As used herein, the term "arylthio" refers to an "aryl" group attached through a sulfur bridge. Examples of arylthio include phenylthio, naphthylthio and the like.

As used herein, the term "C$_{1-10}$ alkylthio" refers to straight chain or branched alkyl groups having from 1 to 10 carbon atoms attached through a sulfur bridge. Examples of C$_{1-10}$alkoxy include methylthio ethylthio, n-propylthio, isopropylthio, cyclohexylthio, different butylthio isomers and the like. Similarly, C$_{1-4}$, C$_{1-6}$ and C$_{1-8}$ alkylthio refer to groups having 1 to 4, 1 to 6, and 1 to 8 carbon atoms, respectively.

By the term "ionised" is meant completely or partially converted into ions.

As used herein, "carbocycle", "carbocyclic residue" or "carbocyclic group" refers to cycloalkyl, cycloalkenyl, or aryl groups as described herein. Examples of carbocycles include, but are not limited to, cyclopropyl, cyclobutyl, cyclopentyl, cyclohexyl, cycloheptyl, adamantyl, cyclooctyl, [3.3.0]bicyclooctane, [4.3.0]bicyclononane, [4.4.0]bicyclodecane (decalin), [2.2.2]bicyclooctane, fluorenyl, phenyl, naphthyl, indanyl, adamantyl, or tetrahydronaphthyl (tetralin). The carbocycle is optionally substituted with one or more substituents which may be the same or different, and are as defined herein.

The term "cycloalkyl" as used herein, refers to a non-aromatic mono- or multicyclic ring system of about 3 to about 10 carbon atoms, preferably of about 5 to about 10 carbon atoms. Preferred ring sizes of monocyclic ring systems include about 5 to about 6 ring atoms. The cycloalkyl is optionally substituted with one or more substituents which may be the same or different, and are as defined herein. Exemplary monocyclic cycloalkyl include cyclopentyl, cyclohexyl, cycloheptyl, and the like. Exemplary multicyclic cycloalkyl include 1-decalin, norbornyl, adamant-(1- or 2-)yl, and the like.

As used herein "cycloalkenyl" refers to a non-aromatic mono- or multicyclic ring system of about 3 to about 10 carbon atoms, preferably of about 5 to about 10 carbon atoms, and which contains at least one carbon-carbon double bond. Preferred ring sizes monocyclic ring systems include about 5 to about 6 ring atoms. The cycloalkenyl is optionally substituted with one or more substituents which may be the same or different, and are as defined herein. Exemplary monocyclic cycloalkenyl include cyclopentenyl, cyclohexenyl, cycloheptenyl, and the like.

The term "heterocycle" or "heterocyclic system" as used herein, refers to a heterocyclyl, heterocyclenyl, or heteroaryl groups as described herein, which consists of carbon atoms and at least one heteroatoms independently selected from the group consisting of N, O and S and including any bicyclic group in which any of the above-defined heterocyclic rings is fused to a benzene ring. The heterocyclic ring may be attached to its pendant group at any heteroatom or carbon atom which results in a stable structure. The heterocyclic rings described herein may be substituted on carbon or on a nitrogen atom if the resulting compound is stable. If specifically noted, a nitrogen in the heterocycle may optionally be quaternized. Examples of heterocycles include, but are not limited to, 1H-indazole, 2-pyrrolidonyl, 2H,6H-1,5,2-dithiazinyl, 2H-pyrrolyl, 3H-indolyl, 4-piperidonyl, 4aH-carbazole, 4H-quinolizinyl, 6H-1,2,5-thiadiazinyl, acridinyl, azocinyl, benzimidazolyl, benzofuranyl, benzothiofuranyl, benzothiophenyl, benzoxazolyl, benzthiazolyl, benztriazolyl, benztetrazolyl, benzisoxazolyl, benzisothiazolyl, benzimidazalonyl, carbazolyl, 4aH-carbazolyl, b-carbolinyl, chromanyl, chromenyl, cinnolinyl, decahydroquinolinyl, 2H,6H-1,5,2-dithiazinyl, dihydrofuro[2,3-b]tetrahydrofuran, furanyl, furazanyl, imidazolidinyl, imidazolinyl, imidazolyl, 1H-indazolyl, indolenyl, indolinyl, indolizinyl, indolyl, isobenzofuranyl, isochromanyl, isoindazolyl, isoindolinyl, isoindolyl, isoquinolinyl, isothiazolyl, isoxazolyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxazolidinylperimidinyl, phenanthridinyl, phenanthrolinyl, phenarsazinyl, phenazinyl, phenothiazinyl, phenoxathiinyl, phenoxazinyl, phthalazinyl, piperazinyl, piperidinyl, pteridinyl, piperidonyl, 4-piperidonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, pyrrolyl, quinazolinyl, quinolinyl, 4H-quinolizinyl, quinoxalinyl, quinuclidinyl, carbolinyl, tetrahydrofuranyl, tetrahydroisoquinolinyl, tetrahydroquinolinyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, triazinyl, 1,2,3-triazolyl, 1,2,4-triazolyl, 1,2,5-triazolyl, 1,3,4-triazolyl, xanthenyl. Preferred heterocycles include, but are not limited to, pyridinyl, furanyl, thienyl, pyrrolyl, pyrazolyl, imidazolyl, indolyl, benzimidazolyl, 1H-indazolyl, oxazolidinyl, benzotriazolyl, benzisoxazolyl, oxindolyl, benzoxazolinyl, or isatinoyl. Also included are fused ring and spiro compounds containing, for example, the above heterocycles.

As used herein "heterocycloalkyl" refers to a non-aromatic saturated monocyclic or multicyclic ring system of about 3 to about 10 carbon atoms, preferably about 4 to about 8 carbon atoms, in which one or more of the carbon atoms in the ring system is/are hetero element(s) other than carbon, for example nitrogen, oxygen or sulfur. Preferred ring sizes of rings of the ring system include about 5 to about 6 ring atoms. The designation of the aza, oxa or thia as a prefix before heterocyclyl define that at least a nitrogen, oxygen or sulfur atom is present respectively as a ring atom. The heterocyclyl may be optionally substituted by one or more substituents which may be the same or different, and are as defined herein.

As used herein, the term "aryl" refers to optionally substituted monocyclic, bicyclic, and biaryl carbocyclic aromatic groups, of 6 to 14 carbon atoms, covalently attached at any ring position capable of forming a stable covalent bond, certain preferred points of attachment being apparent to those skilled in the art. Examples of monocyclic aromatic groups include phenyl, toluoyl, xylyl and the like, each of which may be optionally substituted with C$_{1-6}$acyl, C$_{1-6}$alkyl, C$_{1-6}$alkoxy, C$_{2-6}$alkenyl, C$_{2-6}$alkynyl, C$_{1-6}$alkylsulphonyl, arylsulphonyl, $C_{1-6}$alkylsulphonamido, arylsulphonamido, halo, hydroxy, mercapto, trifluoromethyl, carbamoyl, amino, azido, nitro, cyano, $C_{1-6}$alkylamino or di($C_{1-6}$alkyl)amino. Examples of bicyclic aromatic groups include 1-naphthyl, 2-naphthyl, indenyl and the like, each of which may be optionally substituted with $C_{1-6}$acyl, $C_{1-6}$alkyl, $C_{1-6}$alkoxy, $C_{2-6}$alkenyl, $C_{2-6}$alkynyl, $C_{1-6}$alkylsulphonyl, arylsulphonyl, $C_{1-6}$alkylsulphonamido, arylsulphonamido, halo, hydroxy, mercapto, trifluoromethyl, carbamoyl, amino, azido, nitro, cyano, $C_{1-6}$alkylamino or di($C_{1-6}$alkyl)amino. Examples of biaryl aromatic groups include biphenyl, fluorenyl and the like, each of which may be optionally substituted with $C_{1-6}$acyl, $C_{1-6}$alkyl, $C_{1-6}$alkoxy, $C_{2-6}$alkenyl, $C_{2-6}$alkynyl, $C_{1-6}$alkylsulphonyl, arylsulphonyl, $C_{1-6}$alkylsulphonamido, arylsulphonamido, halo, hydroxy, mercapto, trifluoromethyl, carbamoyl, amino, azido, nitro, cyano, $C_{1-6}$alkylamino or di($C_{1-6}$alkyl)amino.

By the term "heteroaryl" is meant a monocyclic aromatic hydrocarbon group having 5 to 6 ring atoms, or a bicyclic aromatic group having 8 to 10 atoms, containing at least one nitrogen, sulphur or oxygen atom, in which a carbon or nitrogen atom is the point of attachment. The designation of the aza, oxa or thia as a prefix before heteroaryl define that at least a nitrogen, oxygen or sulfur atom is present respectively as a ring atom. The rings or ring systems generally include 1 to 9 carbon atoms in addition to the heteroatom(s) and may be aromatic or pseudoaromatic. _Examples of 5-membered "heteroaryl" groups include pyrrolyl, furyl, thienyl, pyrrolidinyl, imidazolyl, oxazolyl, triazolyl, tetrazolyl, thiazolyl, isoxazolyl, isothiazolyl, pyrazolyl, oxadiazolyl, thiadiazolyl and examples of 6-membered monocyclic nitrogen containing heterocycles include pyridinyl, pyrimidinyl, pyridazinyl, pyrazinyl and triazinyl, piperadinyl, piperazinyl, morpholinyl, each of which may be optionally substituted with $C_{1-6}$acyl, $C_{1-6}$alkyl, $C_{1-6}$alkoxy, $C_{2-6}$alkenyl, $C_{2-6}$alkynyl, $C_{1-6}$alkylsulphonyl, arylsulphonyl, $C_{1-6}$alkylsulphonamido, arylsulphonamido, halo, hydroxy, mercapto, trifluoromethyl, carbamoyl, amino, azido, nitro, cyano, $C_{1-6}$alkylamino or di($C_{1-6}$alkyl)amino. Examples of 9- and 10-membered nitrogen containing bicyclic heterocycles include indolyl, benzoxazolyl, benzothiazolyl, benzisoxazolyl, benzisothiazolyl, indazolyl, benzimidazolyl, purinyl, pteridinyl, indolizinyl, isoquinolyl, isoquinolinyl, quinolinyl, quinoxalinyl, cinnolinyl, phthalazinyl, quinazolinyl, benzotriazinyl and the like, each of which may be optionally substituted with one or more $C_{1-6}$acyl, $C_{1-6}$alkyl, $C_{1-6}$alkoxy, $C_{2-6}$alkenyl, $C_{2-6}$alkynyl, $C_{1-6}$alkylsulphonyl, $C_{1-6}$arylsulphonyl, $C_{1-6}$alkylsulphonamido, $C_{1-6}$arylsulphonamido, halo, hydroxy, mercapto, trifluoromethyl, carbamoyl, amino, azido, nitro, cyano, $C_{1-6}$alkylamino or di($C_{1-6}$alkyl)amino. Examples of preferred heteroaryl groups include (optionally substituted) imidazoles, isoxazoles, isothiazoles, 1,3,4-oxadiazoles, 1,3,4-thiadiazoles, 1,2,4-oxadiazoles, 1,2,4-thiadiazoles, oxazoles, thiazoles, pyridines, pyridazines, pyrimidines, pyrazines, 1,2,4-triazines, 1,3,5-triazines, benzoxazoles, benzothiazoles, benzisoxazoles, benzisothiazoles, quinolines and quinoxalines.

As used herein, the term "heteroaryl$C_{1-4}$ alkyl", refers to a heteroaryl ring as described hereinabove, bonded through a "$C_{1-4}$alkyl" group.

The term "sulphur-containing heterocycle" as used herein refers to mono or bicyclic rings or ring systems which include at least one sulphur atom and optionally one or more further heteroatoms selected from N, S and O. The rings or ring systems generally include 1 to 9 carbon atoms in addition to the heteroatom(s) and may be saturated, unsaturated, aromatic or pseudoaromatic.

Examples of 5-membered monocyclic sulphur containing heterocycles include thiophenes, thiazoles, tetrahydrothiophenes, thiazolidines, thiazolines, isothiazoles, thiadiazoles, oxathiolanes, and dithiolanes each of which may be optionally substituted with $C_{1-6}$alkyl, $C_{1-6}$alkoxy, $C_{3-6}$alkynyl, $C_{3-6}$alkynyl, halo, hydroxy, mercapto, trifluoromethyl, amino, cyano or mono or di($C_{1-6}$alkyl)amino. Examples of 6-membered monocyclic sulphur containing heterocycles include optionally substituted dithianes, thiadiazines, dithiazines, and tetrahydrothiopyrans, each of which may be optionally substituted with $C_{1-6}$alkyl, $C_{1-6}$alkoxy, $C_{3-6}$alkynyl, $C_{3-6}$alkynyl, halo, hydroxy, mercapto, trifluoromethyl, amino, cyano or mono or di($C_{1-6}$alkyl)amino. _Examples of 9- and 10-membered monocyclic sulphur containing heterocycles include benzothiazoles, benzisothiazoles, benzothiophenes, thiophthalans, benzooxathianes, thioisochromans, thiochromenes, thiochromans each of which may be optionally substituted with $C_{1-6}$alkyl, $C_{1-6}$alkoxy, $C_{3-6}$alkynyl, $C_{3-6}$alkynyl, halo, hydroxy, mercapto, trifluoromethyl, amino, cyano or mono or di($C_{1-6}$alkyl)amino. Other examples of sulphur containing heterocyclic rings include thieno heterocycles, thienopyrimidines, thienopyridines, thienotriazines, thienoimidazotriazines, thienothiophenes, tetrahydrothioenothiophenes, dithiophenes, thienofurans, thiaheterocycleny rings, including dihydrothiophenyl and dihydrothiopyrans, thiomorpholines, thiazolidines, and [2,1-b]thiazolines.

The term "$C_{1-6}$ alkylamino" as used herein, refers to a "$C_{1-6}$alkyl" group attached through an amine bridge. Examples of "$C_{1-6}$alkylamino" include methylamino, ethylamino, butylamino and the like.

As used herein, the term "di($C_{1-6}$ alkyl)amino" refers to two "$C_{1-6}$alkyl" groups having the indicated number of carbon atoms attached through an amine bridge. _Examples of "di($C_{1-6}$alkyl)amino" include diethylamino, N-propyl-N-hexylamino, N-cyclopentyl-N-propylamino and the like.

The term "$C_{1-10}$ acylamino" as used herein, refers to a "$C_{1-10}$acyl" group wherein the "$C_{1-10}$acyl" group is in turn attached through the nitrogen atom of an amino group. _The nitrogen atom may itself be substituted with a "$C_{1-6}$alkyl" or "aryl" group. _Examples of a "$C_{1-10}$acylamino" include hexylcarbonylamino, cyclopentylcarbonyl-amino(methyl), benzamido, 4-chlorobenzamido acetamido, propylcarbonylamino, 2-chloroacetamido, methylcarbonylamino(phenyl), biphenylcarbonylamino, naphthylcarbonylamino and the like.

The term "—$NR^{10}R^{11}$" as used herein, refers to a substituted amino function wherein $R^{10}$ and $R^{11}$ are independently selected from hydrogen, optionally substituted $C_{1-10}$acyl, optionally substituted $C_{1-10}$acyloxy, optionally substituted heterocycloalkyl, optionally substituted heteroaryl, optionally substituted aryl, optionally substituted aryl$C_{1-4}$alkyl, and optionally substituted $C_{1-10}$alkyl.

By "saturated" is meant a lack of double and triple bonds between atoms of a radical group such as ethyl, cyclohexyl, pyrrolidinyl, and the like.

By "unsaturated" is meant the presence one or more double and triple bonds between atoms of a radical group such as vinyl, acetylenyl, oxazolinyl, cyclohexenyl, acetyl and the like.

Conventionally, the word "polymer" used as a noun is ambiguous; it is commonly employed to refer to both polymer substances and polymer molecules. As used herein, "macromolecule" is used for individual molecules and "polymer" is used to denote a substance composed of macromolecules. The term "polymer" may also be employed unambiguously as an adjective, according to accepted usage, e.g. "polymer blend", "polymer molecule". As used herein a "macromolecule", is a molecule of high relative molecular mass, the structure of which essentially comprises the multiple repetition of units derived, actually or conceptually, from molecules of relatively low molecular mass.

As used herein a "constitutional unit", refers to an atom or group of atoms (with pendant atoms or groups of atoms, if any) comprising a part of the essential structure of a macromolecule, a block or a chain. As used herein a "block", refers to a portion of a macromolecule, comprising many constitutional units, which has at least one feature that is not present in the adjacent portions. As used herein a "chain", refers to the whole or part of a macromolecule or block comprising a linear or branched sequence of constitutional units between two boundary constitutional units, each of which may be either an end-group or a branch point or an otherwise-designated characteristic feature of the macromolecule. As used herein a "constitutional sequence", refers to the whole or part of a chain comprising one or more species of the constitutional unit(s) in a defined sequence.

As used herein the terms such as "bind," "binding," "interact," "interacting" and the like refer to a physical association between two or more molecules, wherein the association may involve the formation of an induced magnetic field or paramagnetic field, covalent bond formation, an ionic interaction such as occurs in an ionic lattice, a hydrogen bond or alternatively, a van der Waals interaction such as a dipole-dipole interaction, dipole-induced dipole interaction, induced dipole-induced dipole interaction or a repulsive interaction or any combination of the above forces of attraction. In some embodiments, these terms refer to the capacity to attract and hold something. In illustrative examples, the methods of the present invention have application in metal catalysed organic reactions from solid supports, or metal binding of antibodies or proteins to nanoparticle surfaces.

In other embodiments, the methods of the present invention have application in the selective remediation of heavy metals from the human blood system, which has the potential to reduce symptoms caused by the deleterious effects of such heavy metals.

As used herein the term "solid support" refers to an insoluble, functionalised, polymeric material. A suitably derivatised solid support can be "surface functionalised" to contain functional groups to which metal ions can bind, often via a linker, allowing them to be readily separated from solvents.

As used herein the term "linker" refers to a bifunctional chemical moiety attaching a functional group, such as a ligand, to a solid support.

It is evident to those skilled in the art that selected functional groups of the present invention may exist as resonance hybrids such as the following for the xanthate group:

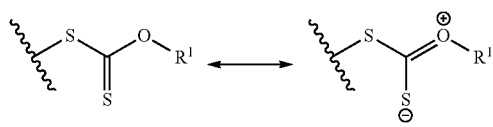

There are a diverse range of methods for the preparation of polymers known to those skilled in the art. The following descriptions of polymerisation methods and mechanisms are intended to illustrate specific embodiments, and they are not intended to preclude any other polymerisation mechanism recognised by those skilled in the art. Illustrative examples of polymerisation methods include: "addition polymerisation" which refers to a process whereby the monomer molecules bond to each other without the loss of any other atoms-alkene monomers are the biggest groups of polymers in this class; "chain polymerisation" which refers to a chain reaction in which the growth of a polymer chain proceeds exclusively by reaction(s) between monomer(s) and reactive site(s) on the polymer chain, with regeneration of the reactive site(s) at the end of each growth step; "free radical polymerisation" which refers to refers to the synthesis of a polymer involving the chain reaction of free radicals with monomers; "condensation polymerisation" which refers to a process whereby usually two different monomer combine with the loss of a small molecule, usually water; and "star-branching" which refers to a type of polymerisation in which a branched polymer is formed as branches emanating from a single point.

As defined herein, the term "living polymerisation" refers to chain growth polymerisations proceeding in the absence of negligible chain breaking terminations.

As used herein a "monodisperse system" refers to a polymer system in which there is a relatively low distribution of molecular weights present. As used herein a "polydisperse polymer system" refers to a polymer system in which there is a relatively high distribution of molecular weights present.

Unless otherwise specified, polydispersity index or PDI refers to the ratio of mean/median for a distribution, or more specifically for the case of molecular weight measurements, polydispersity index is known in the art as Mw/Mn, where Mw is the weight average molecular weight and Mn is the number average molecular weight of a polymer sample. Values of PDI in this specification range from 1.0 and higher, with values near 1.0 representing relatively monodisperse samples.

The term "living polymerisation" was first coined in 1956 (Szwarc) to describe anionic polymerisation that proceeds without the occurrence of irreversible chain-breaking processes, such as chain transfer and termination. Such polymerisation provides strict control of the polymer end groups and allows synthesis of block co-polymers via sequential polymerisation of two or more monomers. Living polymerisation may include: slow initiation, reversible formation of species with various activities and lifetimes, reversible formation of inactive (dormant) species (reversible deactivation), and in some cases reversible transfer.

To distinguish between these processes and "living" polymerisation as defined by Szwarc, terms such as "controlled", "pseudo-living", "quasi-living" and "controlled/living" polymerisation have been introduced. As used herein, the term "controlled" describes all polymerisation processes from which polymers with predetermined molar masses and low polydispersities can be obtained. The main criterion for living free-radical polymerisation behaviour is that experimental conditions must be selected to ensure that radical-radical termination and other side reactions (e.g. transfer to monomer, polymer, solvent etc.) is negligible.

Controlled polymerisation is a synthetic method to prepare polymers which are well-defined with respect to: topology (e.g., linear, star-shaped, comb-shaped, dendritic, cyclic), terminal functionality, composition and arrangement of comonomers (e.g., statistical, periodic, block, graft, gradient), and have molecular weights predetermined by the ratio of concentrations of reacted monomer to introduced initiator. Controlled polymerisation may include transfer and termination but at a proportion low enough not to significantly affect the control of molecular properties as stated above. This means the rate of these side reactions should be low enough in comparison with propagation rate to reach a given synthetic goal. In addition, the time of mixing reagents should be short compared to the half-life of the polymerisation, the rate of initiation should be at least comparable to that of propagation, the rate of exchange between various active species should be faster than that of propagation of the fastest species, and the rate of de-propagation should be low in comparison to that of propagation. Controlled polymerisations are living if irreversible transfer and termination is below the detection limit using currently available instrumentation.

The following descriptions of polymerisation methods and mechanisms are intended to illustrate specific embodiments, and they are not intended to preclude any other polymerisation mechanism recognised by those skilled in the art.

Controlled radical polymerisation includes techniques such as atom transfer radical polymerisation (ATR P), nitroxide-mediated radical polymerisation (NMP), degenerative transfer (DT) and reversible addition-fragmentation chain transfer polymerisation (RAFT).

In degenerative transfer, controlled polymerisation occurs via direct exchange of an atom or group between propagating macroradical chains. The control agent, which typically is an organyl halide with labile C—X bonds provides the atom or group necessary for DT.

In polymerisation by reversible addition-fragmentation transfer, an initiator produces a free radical that subsequently reacts with a polymerisable monomer. Polymerisation occurs via rapid chain transfer between growing polymer radicals and dormant polymer chains. The monomer radical reacts with other monomers and propagates to form a chain, which can react with a control agent, such as a dithioester. After initiation, the control agent becomes part of the dormant polymer chain. The control agent can fragment, either forming which will react with another monomer that will form a new chain or which will continue to propagate. In theory, propagation will continue until no more monomer is left and a termination step occurs. After the first polymerisation has finished, in particular circumstances, a second monomer can be added to the system to form a block copolymer. Such a technique can also be used to synthesise multiblock, graft, star, and end-functional polymers.

including the mechanism for polymerisation, the types of monomers being used, the type of initiation, the solvent system, and the reaction conditions. Many different types of control agents have been investigated.

A common feature of controlled free radical polymerisations is the use of a control agent to introduce reaction pathways for reversible formation of dormant polymer chains from growing macroradicals. Under typical conditions, the equilibrium position of the reversible reaction is shifted strongly toward the dormant species, which lowers the concentration of macroradicals to the point where the rate of termination by bimolecular reactions (for example, radical combination) is negligible compared to the rate of propagation. Controlled polymerisation by ATRP, RAFT, NMP and DT have been studied extensively, and detailed mechanisms have been proposed for these systems. In other cases, reaction mechanisms are not well established, but it is clear that addition of specific reagents facilitates reversible formation of stable free radicals and leads to behaviour characteristic of controlled free radical polymerisation.

All polymerisation reactions must be initiated. For some monomers, such as styrene, for example, thermal self-initiation can occur without the need for additional reagents. For many other monomers, initiation may be accomplished by adding an agent to trigger one or more chemical reactions that ultimately produces an intermediate capable of propagating polymerisation. These agents often are referred to as "initiators". The type of initiators suitable for the present invention depend greatly on the details of the polymerisation, including the mechanism for polymerisation, the types of monomers being used, the type of control agent, the solvent system and the reaction conditions. Many different types of initiators have been investigated. As defined herein "initiation reaction" refers to the first step in chain polymerisation. Initiation involves the formation of a free radical. As defined herein a "free radical" is a molecule with an unpaired electron, making it highly reactive. As defined herein an "initiator" is a molecule that decomposes into a free radical and used to "initiate" a polymer growth reaction.

Initiation

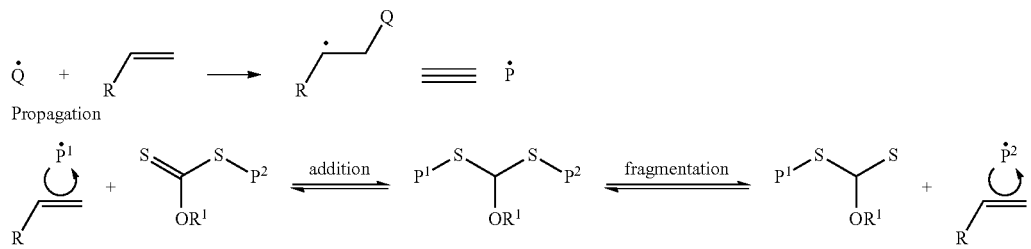

Propagation

Atom transfer radical polymerisation (ATRP) is a catalysed, reversible redox process that achieves controlled polymerisation via facile transfer of labile radicals between growing polymer chains and a control agent. Normally, the labile radical is a halogen atom and the control agent is a metal/ligand combination that is stable in two different oxidation states. Chain polymerisation can be initiated in two ways, "direct ATRP" and "reverse ATRP".

Controlled polymerisation requires the presence of an agent to control the course of polymerisation while minimising undesirable side reactions, such as chain termination. These agents are called "control agents", and their characteristics depend greatly on the details of the polymerisation, The initiator may be an initiator for polymerisation by a free radical mechanism, such as ATRP and RAFT or a related mechanism involving stable free radicals. Typically, suitable initiators for free radical polymerisation are reagents or combinations of reagents that are capable of producing free radicals. Other methods for producing free radicals, including exposure to ionising radiation (electron beam, X-ray radiation, gamma-ray radiation, and the like), photochemical reactions, and sonication, will be evident to those of skill in the art as suitable methods for initiating free radical polymerisation.

The addition of optional promoters or inhibitors may provide practical advantages, including for example better control over initiation, more favourable reaction times, extended catalyst lifetimes and enhanced selectivity. The addition of other optional substances, including for example buffering ingredients, co-surfactants and antifreeze, may offer further advantages. As used herein the term "promoter" refers to a substance that, when added in relatively small amounts to a polymerisation system, imparts greater activity, improved selectivity or better stability. As used herein the term "inhibitor" refers to a substance that, when added in relatively small amounts to a polymerisation system, leads to decreased activity.

Surfactants may be essential for preparation of polymers. Suitable surfactants include any compound or mixture of compounds capable of stabilising colloidal aqueous emulsions. Generally, surfactants are amphiphilic molecules that reduce the surface tension of liquids, or reduce interfacial tension between two liquids or a liquid and a solid. Surfactants may be small molecules or polymers, micelle-forming or non-micelle-forming, and may be anionic, cationic, zwitterionic or non-ionic.

Monomers that may be polymerised using the foregoing methods include at least one monomer selected from the group consisting of styrene, substituted styrene, alkyl acrylate, substituted alkyl acrylate, alkyl methacrylate, substituted alkyl methacrylate, acrylonitrile, methacrylonitrile, acrylamide, methacrylamide, N-alkylacrylamide, N-alkylmethacrylamide, N,N-dialkylacrylamide, N,N-dialkylmethacrylamide, isoprene, 1,3-butadiene, ethylene, vinyl acetate, vinyl chloride, vinylidene chloride, oxidants, lactones, lactams, cyclic anhydrides, cyclic siloxanes and combinations thereof. Functionalized versions of these monomers may also be used. _Specific monomers or comonomers that may be used in this invention include methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, a-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylaminostyrene (all isomers), a-methylvinyl benzoic acid (all isomers), diethylamino alpha-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, maleic anhydride, N-phenylmaleimide, N-butylmaleimide, chloroprene, ethylene, vinyl acetate, vinyl chloride, vinylidene chloride, 2-(2-oxo-1-imidazolidinyl)ethyl 2-methyl-2-propenoate, 1-[2-[2-hydroxy-3-(2-propyl)propyl]amino]ethyl]-2-imidazolidinone, N-vinyl pyrrolidone, N-vinyl imidazole, crotonic acid, vinyl sulfonic acid, and combinations thereof.

One group of polymer precursors are acrylate monomers, which are esters which contain vinyl groups. An example of a acrylate monomer is 2-(acetoacetoxy)ethyl methacrylate. Acrylate monomers are use to synthesise acrylates which are a type of vinyl polymer. Some acrylates have an extra methyl group attached to the alpha carbon, and these are called methacrylates. One of the most common methacrylate polymers is poly(methyl methacrylate).

The polymerisation systems described in this invention are combinations or mixtures of components, which include water, surfactant, control agent and at least one monomer.

In the preparation of polymers for uses in the methods of the present invention, control agent, initiator, promoter and inhibitor may be present in either or both solutions before mixing, or they may be generated in-situ during emulsification, or they may be added after emulsification. The polymerisation system is subjected to polymerisation conditions to effect polymerisation of at least one monomer. For random copolymers or higher order inter-polymers, two or more monomers may be added to the polymerisation system at the same time. For block copolymers, the monomers are typically added in a desired sequence in order to grow the desired block. For the emulsion polymerisation systems, the polymerisation system is considered to be the starting components, which are subjected to the polymerisation conditions. The products of such polymerisation systems are the emulsions themselves or the polymers, after isolation or drying. The ratios of components (e.g., initiators, surfactants, monomers, control agents, etc.) in the polymerisation system may be important and can vary widely depending on the particular embodiment being practiced. The ratio of monomer to control agent can be used to determine the molecular weight of polymers produced using the controlled emulsion polymerisation processes of this invention. According to these processes, the number average molecular weight of the resulting polymers depends linearly on the number of polymer chains in the polymerisation and the mass of monomer. Assuming every growing chain contains one residue derived from the control agent, the selection of a monomer to control agent ratio provides an opportunity to control in advance the polymer molecular weight (or degree of polymerisation). Typically, however, the actual molecular weight differs from the predicted molecular weight by a relatively constant percentage, and this difference should be taken into account when targeting a product with a desired molecular weight.

Another ratio that may be important is the ratio of equivalents of initiator to control agent. For many controlled polymerisations, including for example ROMP, NMP, cationic and anionic polymerisation, the number of polymer chains initiated should equal, in principle, the number of control agent molecules. For controlled polymerisation via transfer mechanisms, including for example RAFT, DT and ATRP, only catalytic amounts of initiator are required, in principle, to achieve complete conversion. In practice, initiator efficiencies vary greatly and it often may be desirable to adjust the initiator to control agent ratio to achieve desirable results.

The surfactant to monomer ratio may be controlled. Suitable ratios of surfactants to monomers are well known in the art. Once emulsions are formed by in-situ surfactant synthesis, the surfactant to monomer ratio may be adjusted further by adding additional surfactant, which may be the same surfactant or a different surfactant that is not necessarily synthesised in-situ.

Polymerisation conditions include the ratio of components, system temperatures, pressure, type of atmosphere, reaction time and other conditions generally known to those of skill in the art.

In the broadest sense, an emulsion polymerisation is any heterogeneous polymerisation in an aqueous environment. Typically, these systems produce particles of polymer as product. Those skilled in the art recognise many variants of these polymerisations, with typical classifications distinguishing between polymerisations occurring in true emulsions, micro emulsions, mini emulsions, suspensions and dispersions. These processes are generally distinguished by differences in process, components or results, with specific factors including the presence, amount and type of surfactant required; presence, amount and type of initiator; type and amount of monomer, including monomer solubility; polymerisation kinetics; temperature; order of addition of the components, including the timing of addition of the components (e.g., monomer); solubility of the polymeric product; agitation; presence of co-solvents or hydrophobes; resulting particle size; particle stability in the polymerisation system toward coagulation or sedimentation; and other factors known to those skilled in the art.

The "living" nature of the polymerisation processes provide those of skill in the art the ability to create virtually any type of polymer architecture desired, as well as selection from a wide variety of monomers. Thus, this invention includes block copolymers derived from controlled copolymerisation of two or more monomers.

According to Scheme 1, a multifunctional RAFT 6 arm core (21) can be prepared from hexakis(bromomethyl)benzene (20) by reaction with sodium dithiobenzoate, in an inert solvent such as THF, at about 50° C., for about 3 hours. The core (21) can then be reacted with a monomer such as tert-butyl acrylate ($^t$BA) under standard conditions (AIBN, toluene, 60° C.), to afford the star branched polymer (22). Polymer (22) can then be reacted with a further monomer under standard conditions (AIBN, toluene, 60° C.), to afford the copolymer (23). The dithiobenzoate function of polymer (23) can then be cleaved in the presence of a base such as hexyl amine, in an ether such as THF, or other such inert solvent, at about room temperature, for about 12 to 24 hours (overnight), to afford the thiol derivatised polymer (24).

According to Scheme 2,1,1,1-trihydroxymethyl propane (1) can be reacted with α-bromophenyl acetic acid by refluxing 12-18 hours (overnight) in toluene to afford derivative (25) which can be subsequently reacted with sodium methyl trithiocarbonate in ethylacetate at room temperature for 4 hours, to afford multifunctional RAFT 3 arm core (26). Core (25) can then be reacted with a monomer such as styrene (under standard conditions: toluene, AIBN, 60° C.) to afford star polymer (27). Styrene based polymer (27) can be further reacted with another monomer (such as AAEA or 2-(acetoacetoxy)ethyl methacrylate (AAEMA)) under standard conditions (AIBN, toluene, 60° C.), to afford copolymer (28). The trithiocarbamate can be cleaved with piperidine under standard conditions to afford the thiol derivative (29).

According to Scheme 3, derivative (26) as shown in Scheme 2, can be treated with a nitrogenous base, such as piperidine, to afford a thiol derivative (30).

According to Scheme 4, derivative (25) can be used as a multifunctional ATRP 2 arm core. Derivative (25) is reacted with styrene in the presence of CuBr, 2,2'-bipyridyl (BiPy), in toluene at 90° C. to afford the three-arm styrene star polymer (31). Star polymer (31) is then reacted with the monomer methyl acrylate, in toluene, in the presence of CuBr, BiPy, at 90° C., to afford block copolymer (32). The bromo-end groups of star polymer derivative (32), can then be reacted overnight with thiodimethyl formamide at 60° C. to afford the thiol end group derivative (34). Alternatively, the bromo-end group derivative (32), can be reacted with bis(thiobenzoyl) disulphide in the presence of CuBr and BiPy to afford the dithioester-end group derivative (33). The dithioester derivative (33) can subsequently be treated with a nitrogenous base such as hexylamine, in an inert solvent such as THF, for at about 12-18 hours at about room temperature, in order to afford thiol derivative (34).

The word 'comprising' and forms of the word 'comprising' as used in this description does not limit the invention claimed to exclude any variants or additions.

Modifications and improvements to the invention will be readily apparent to those skilled in the art. Such modifications and improvements are intended to be within the scope of this invention.

EXAMPLES

Various embodiments/aspects of the invention will now be described with reference to the following non-limiting examples. Specifically the following examples illustrate (i) the capacity of particles to sequester a variety of metals (particularly heavy metals commonly found in toxic concentrations on contaminated mine sites) in solution and (ii) the germination potential and early growth of selected Australian native grasses under toxic concentrations of heavy metals in the presence or absence of particles.

Example 1

Synthesis of Metal Binding Hydrogel Micro- and Nanosized Particles

Designer particles suitable for both irreversible metal sequestering and storage of water to assist revegetation in drought conditions were synthesized from 'living' radical polymerization. Dimethyl acrylamide and bisacrylamide monomers were copolymerized via RAFT-mediated emulsion polymerization (Juranicova et al., 1998) to produce crosslinked hydrogel particles (NP1). A macromeric RAFT agent was used in the synthesis, namely P (DMA)-RAFT (5CNUR69, Mn=4000, PDI=1.11). The RAFT agent was hydrolysed to thiols (NP2), which are known to bind irreversibly to a wide range of heavy metals (e.g. Hg, Cd, Cu, Pb). In cases, where selectivity is required, the dithioester (NP1) could also be utilized (Bell et al., 2006). These hydrogels (polyacrylamide) exhibit a high water retaining capacity (greater than 90% of its mass), good mechanical strength and their decomposition products have been shown to pose no environmental threat (Barvenik, 1994). _In addition, Nadler et al. (1994) demonstrated that polyacrylamide added to the surface soil minimizes water run-off, erosion and crusting and stabilises soil structure. Also, Bicerano (1994) found that the addition of small quantities of polyacrylamide to irrigation water appreciably reduces soil loss and increases net infiltration. _Therefore, this material is ideal for the synthesis of hydrogel micro- and nanosized particles for use in environmental remediation technologies. The water delivery and heavy metal binding properties of these particles could be controlled by manipulation of the emulsion process: (i) particle size can be predetermined by simply changing the method of preparation (Mathur et al., 1996), (ii) water retention and mechanical properties can be manipulated by the incorporation of other less hydrophilic monomers (e.g. styrene, methylacrylate, methyl methacrylate) or through changing the amount or identity of the crosslinker, and (iii) the metal binding capacity can be firstly controlled by the incorporation of RAFT-agent (Bell et al., 2006) (NP1), and then hydrolysed to thiol end-groups (NP2), and cage ligands can be attached to NP1 to bind to many other metals (Say et al., 2002a, b; Bell et al., 2006).

Example 2

Capacity of Particles to Sequester Heavy Metals in Solution

Experiments were conducted using four different types of particles, (i) control (polymer without xanthate), (ii) xanthate and (iii) thiol (after hydrolysis of xanthate) microsized particles, and (iv) macromeric RAFT agent P(DMA)-RAFT trithiocarbamate nanosized particles. Particles were added to 10 mL of heavy metal solutions and mixed overnight. A ratio of 1 mole of RAFT to 2 moles of heavy metals was used. Four different metals/metalloid (arsenate, lead, copper and zinc) were selected for the study and only one concentration per metal (identified as toxic to the Australian native grass *Astrebla lappacea* during germination experiments) was tested (i.e. 667 µM As, 9650 µM Pb, 4000 µM Cu and 10000 µM Zn). After centrifugation of the mixing solutions, supernatants containing the fraction of free soluble metals that were not sequestered by the particles (metals bound to the particles were in the pellets) were collected and total metal concentrations analysed via ICP-OES (Inductively Coupled Plasma-Optical Emission Spectroscopy). Capacity of the different types of particles to sequester heavy metals and to reduce their soluble concentrations in the supernatant is presented in Table 1.

TABLE 1

Capacity of different types of particles to sequester heavy metals in solution. Reduction in soluble metal concentrations in the supernatant is given as the mean ± SE for n = 3. Negative values indicate an increase of metal concentration in the supernatant after particle action.

| Metal/Metalloid | Type of particles | | | |
| --- | --- | --- | --- | --- |
| | Control | Xanthate (microsize) | Thiol (microsize) | PDMA RAFT* (nanosize) |
| $As^{2-}$ | −3.2 ± 1.9 | −1.5 ± 2.4 | −13.0 ± 0.7 | — |
| $Cu^{2+}$ | 25.1 ± 2.2 | 27.1 ± 1.6 | 75.5 ± 0.7 | 71.8 ± 3.2 |
| $Pb^{2+}$ | 49.0 ± 1.0 | 43.9 ± 2.4 | 86.4 ± 0.5 | — |
| $Zn^{2+}$ | 23.7 ± 1.7 | 29.2 ± 3.0 | 63.8 ± 0.7 | — |

*Only a limited amount of nanosized particles was available at the time of experimentation and it was possible to test its metal binding capacities with copper only.

Results showed that the addition of microsized thiol particles reduced soluble metal concentrations of Cu, Pb and Zn by 75.5, 86.4 and 63.8% respectively (Table 1). Reducing the size of the RAFT-functional particles from micro to nanosize resulted in an increase of the percentage of Cu sequestration from 27.1 to 71.8%. This suggests that efficiency of metal sequestration could be improved by using thiol nanosized particles. Addition of particles to arsenate solution resulted in an increase of As concentration (up to +13%, Table 1) in the supernatant.

The result with As was unexpected. An additional mixing experiment was therefore performed using the ratio 102 moles of xanthate (microsize xanthate particles) to 1 mole of arsenate so as to investigate further. Arsenate concentration in the supernatant was then increased by +66.4%±1.2. It was found that this increase of As in the supernatant resulted from the capacity of the particles to exclude. As and absorb water instead (same number of moles of free As in a reduced volume of water). This suggests that our particles could be used to exclude As from contaminated substrates.

Example 3

Assessing the Germination Potential of the Native Grass *Astrebla lappacea* Under Toxic Heavy Metal Conditions in the Presence of Thiol Particles Seeds were germinated in a germination cabinet under control (sterile deionised water) and heavy metal conditions in the presence or absence of particles. Different concentrations of Zn ($ZnCl_2$) and Pb ($PbCl_2$) solutions were used, but for brevity, results using toxic concentrations of Zn (10000 µM) and Pb (9650 and 4825 µM) only (that were also chosen for the mixing experiments previously described) will be presented. Petri dishes and filter papers were used to conduct the germination trial (five replicates per treatment and 25 seeds per Petri dish). 10 mL of sterile deionised water or metal solution were added to each Petri dish. Particles (ratio 1 mole of xanthate to 2 moles of heavy metal) were added uniformly on the surface of the filter papers.

The Petri dishes were sealed with parafilm and placed in a transparent plastic zip resealable bag to reduce water evaporation and placed into controlled conditions within the germination cabinet at day and night temperatures of 30° C. and 25° C. respectively.

The seeds were exposed to 12 hours light per day. Germinated and dead seeds were counted and removed daily within a laminar flow cabinet to minimise fungal and bacterial infection, until the maximum germination percentage was reached (13 days in our trial). Radical length of germinated seeds was also measured. From the measurements taken (number of germinated seeds and radical length), the germination percentage and the root tolerance index (RTI) were calculated.

FIG. 2 shows percentages of germination of seeds treated with lead and/or particles over time. Germination was strongly reduced in the presence of Pb 4825 µM (which is above the maximum concentration of lead reported for a range of contaminated soils investigated from various countries by Wiersma et al. 1986), and totally inhibited with Pb 9650 µM. Maximum germination percentages calculated after 13 days of treatment were 8.8% and 0% respectively. When particles were added, germination potential of seeds in the presence of Pb greatly increased and maximum germination percentages recorded were slightly lower than the control with deionised water (78.4%) for P δ 9650 µM (51.2%) and not significantly different from the control for P δ 4825 µM (72%).

This shows that addition of particles was not toxic to seeds and resulted in a reduction of the soluble concentration of Pb which in turn allowed the seeds to germinate in the presence of high concentrations of Pb that are normally toxic to the grass species. Similar results were found with zinc (FIG. 3). In the presence of 10000 µM of Zn and particles, maximum germination percentage (76%) was similar to the percentage recorded for the control (78.4%). In the absence of particles, this concentration of Zn strongly decreased the maximum germination percentage to 4.8%.

Root tolerance index (RTI) was calculated after two days of treatment and expressed as a percentage of the maximum root length encountered in the control with deionised water using the following formula:

$$RTI = \frac{\text{Length of the longest radicle in metal treatment}}{\text{Length of the longest radical in control}} \times 100$$

Results (Table 2) showed that radical elongation was totally inhibited in seeds treated with heavy metals only. RTI was 0% for all metal treatments presented with the exception of Pb 4825 µM which displayed a very high standard error due to a high variability within replicates (RTI calculated for three of the five replicates were 0%). Addition of particles did not affect the root elongation of seeds as RTI of seeds germinated with deionised water and particles (96.5%) was not statistically different from the control with deionised water (100%). When particles were added to the metal solution, RTI was greatly increased to 28.5%, 52.2% and 69.2% for P δ 9650 µM, Pb 4825 µM and Zn 10000 µM respectively (Table 2 and FIG. 4).

TABLE 2

Root tolerance index (RTI) calculated after two days of treatment and given as the mean ± SE for n = 5.

| Treatment | RTI (%) |
|---|---|
| Control - Deionised water | 100 |
| Deionised water + Particles | 96.5 ± 2.7 |
| Pb (9650 µM) | 0 ± 0 |
| Pb (9650 µM) + Particles | 28.5 ± 3.7 |
| Pb (4825 µM) | 15.5 ± 9.8 |
| Pb (4825 µM) + Particles | 52.2 ± 4.3 |
| Zn (10000 µM) | 0 ± 0 |
| Zn (10000 µM) + Particles | 69.2 ± 8.1 |

The RTI of seeds germinated with Pb and Cu could potentially be improved by using nanosized thiol particles and/or increasing the ratio number of moles of xanthate added to number of moles of metals.

Example 4

Assessing the Water Holding Capacity of the Particles

The water holding capacities of particles were tested to investigate the potential of the polymers to provide an alternative water source during seed germination and vegetation establishment. The polymers were placed into tared small glass vials and hydrated with excess deionised water for 12 hrs. Each polymer type was blotted onto filter paper to remove surplus water. The hydrated polymer was then placed into individually weighed vials (with three replicates) and weighed to calculate the hydrated polymer weight. After the hydrated polymers were allowed to air-dry for 48 hrs, the polymers were then further dried to constant weight in a vacuum oven at 25° C. for 24 h. The treatments were then re-weighed to obtain the dry weight of the particles. The water holding capacity was calculated as the difference between the hydrated and dry polymer weights, expressed as a percentage of polymer dry weight and the results are set out in Table 3.

TABLE 3

Water holding capacity of polymers X1, X2, X3 and X4 as a percentage of dry weight. X1, X2, X3 and X4 correspond to micro-size non-functional (control), micro-size xanthate functional, micro-size thiol functional and nano-size PDMA-RAFT-trithiocarbamate functional polymers, respectively. The Reversible Addition-Fragmentation Transfer (RAFT) was xanthate for X2 and X3, and macromeric RAFT agent P (DMA)-RAFT-trithiocarbamate for X4. Results are given as the mean ± SE for n = 3.

| Type of particles | | | |
|---|---|---|---|
| X1 | X2 | X3 | X4 |
| 470.5 ± 38.9 | 764.1 ± 16.8 | 607.8 ± 30.1 | 1058.7 ± 143.0 |

The results recorded in Table 3 illustrate that the particles tested exhibited a high water holding capacity ranging from 470.5% (microsize particles) to 1058.7% (nanosize particles) of their dry mass, suggesting that they have potential for increasing the volume of plant available water during seed germination and establishment of the plant.

Synthesis of Preferred Polymeric Particles

Example 5

Preparation of Starting Materials 5.1 Preparation of 1-methyl-8-amine-3,13,16-trithia-6,10,19-triazabicyclo[6.6.6]icosane (35)

$NH_2$capten (35) was synthesised according to the method described by Gahan et al, *Inorg. Chem.* 1982, 21, 2699-2706. The macrobicyclic ligand ($NH_2$ capten, 35, FIG. 4) contains both secondary amine (σ donor) and thioether (π acceptor) metal coordination sites as well as a suitably positioned amine functionality for attachment to the nanoparticle (FIG. 4).

5.2 Preparation of O-ethylxanthyl Ethyl Benzene (MADIX) (36)

Synthesis was achieved following a literature procedure (Charmot, D., et al).

Potassium O-ethyldithiocarbonate (3 g, 0.019 mol, Aldrich, 99%) was added to a stirred mixture of (1-bromoethyl) benzene (2.712 g, 0.015 mol, Aldrich, 98%) in absolute ethanol (50 mL). The mixture was stirred for 4 h at room temperature under a $N_2$ atmosphere. Water (50 mL) was added, and the organic phase was extracted with diethyl ether/pentane (1:2, 3×50 mL). These fractions were collected and the solvent was removed under vacuum to obtain 36. Purity was obtained at >99% according to $^1H$ and $^{13}C$ NMR.

Example 6

Preparation of Functional Nanoparticles (FIG. 2)

6.1 Ab Initio Emulsion Polymerisation of Styrene (37)

To a 250 mL three-neck round bottom flask was added water (90 g), STY (40.5 g, 0.389 mol), SDS (0.4806 g, 0.0017 mol) and 36 (0.3049 g, 0.0013 mol). The solution was stirred and heated at 70° C. while being degassed with nitrogen sparging for 30 minutes. APS (0.1551 g, 0.679 mmol) was added and the reaction was allowed to proceed under $N_2$ for 24 hours. Samples were taken at regular intervals to determine conversion by gravimetry and Molecular Weight Distribution by Size Exclusion Chromatography. The final reaction mixture was dialysed for 3 days with Snakeskin Dialysis Tubing™ to remove low molecular weight impurities to afford PSTY latex 37. The average particle size was determined by dynamic light scattering. Table 4 gives all experimental conditions to make PSTY nanoparticles, including number-average molecular weights ($M_n$), polydispersity index (PDI), particle sizes and number of particles/unit volume ($N_c$).

TABLE 4

List of all experimental conditions in the ab inito and seeded polymerisation of all three emulsions[a]

| Emulsion # | [STY] mol dm−3 | [APS] mol dm−3 | [MADIX] mol dm−3 | [SDS] × cmc mol dm−3 | $M_n$ (g/mol) | PDI | D (nm) (no. av)[b] | $N_c$ |
|---|---|---|---|---|---|---|---|---|
| 1 | 2.98 | 0.001 | 0.01 | 1.2 | 51871 | 2.139 | 109.70 | 6.24E+17 |
| 2 | 2.98 | 0.005 | 0.01 | 1.5 | 47790 | 1.919 | 78.43 | 1.71E+18 |
| 3 | 2.98 | 0.005 | 0.01 | 6 | 39991 | 2.313 | —[c] | —[c] |

| | [APS] mol dm−3 | % wt AAEMA | | [SDS] × cmc mol dm−3 | $M_n$ (g/mol) | PDI | D (nm) (no. av) | $N_c$ |
|---|---|---|---|---|---|---|---|---|
| 4 | Seed 1 | 0.005 | 2 | 1.5 | 53170 | 2.035 | 116.60 | 3.34E+17 |
| 5 | Seed 2 | 0.005 | 2 | 1.5 | 42349 | 2.147 | 77.46 | 1.14E+18 |
| 6 | Seed 3 | 0.005 | 2 | 1.5 | 41373 | 2.226 | 44.89 | 5.85E+18 |

[a] Data of number-average diameter, which was used to calculate number of particles per unit volume ($N_c$). All concentrations were calculated from the total reaction volume.
[b] Calculated from Dynamic Light Scattering.
[c] Aggragation of this sample of nanoparticles prevented accurate analysis for this experiment.

6.2 Seeded Emulsion Polymerisation of AAEMA onto the PSTY Core (38)

The resulting PSTY latex 37 from the above example was used in a second stage emulsion polymerization. The latex 37 was degassed by bubbling $N_2$ with stirring for 30 min. The reaction temperature was raised to 70° C., and APS (0.1551 g, 0.679 mmol) was added to start polymerization. _After 15 min, AAEMA (1.0037 g, 0.005 mol) was added drop-wise to the vessel via a pressure equalizing side-arm drop funnel over the period of 1 h, and the polymerization stopped after a further 2 h (approximately full conversion). The final latex was quenched by cooling, and then dialysed against MilliQ water for 3 days to remove low molecular weight impurities affording latex 38. XPS was used to confirm the presence of AAEMA on the surface of the nanoparticle.

6.3 Coupling of 35 to Nanoparticles (39)

The resulting latex 38 from above was used to couple 35 to the particle surface. To a 10 mL stirred solution of the nanoparticles was added dropwise 10 mL of MilliQ water containing 35 (0.7284 g, 2 mmol) at room temperature. The amount of 35 was in excess of the moles of AAEMA monomer units in latex 38. The reaction mixture was stirred overnight and the resulting coupled nanoparticles were dialysed in Snakeskin Pleated Dialysis Tubing for 2 days to remove any uncoupled ligand 35, thus providing the cage derivatised nanoparticles 39. Coupling was confirmed by XPS that showed peaks characteristic of sulphur and nitrogen.

Example 7

Metal Binding Studies Using Radioisotopes

7.1 Binding Studies to Capten Derivative (35)

Typically radiometal ion solutions were prepared by spiking an accurately know solution of a metal ion (e.g. $Hg^{2+}$, $Pb^{2+}$ and $Co^{2+}$) with the respective radiotracers (e.g. Hg-197/Hg-203, Pb-201 and Co-57). The final concentration of $Co^{2+}$, $Hg^{2+}$ and $Pb^{2+}$ was 0.0261 μM, 0.1466 mM) and 1.8859 μM in a 0.1M HCl solution. Complexation study typically involved an incubation with accurately known varying concentration of the metal ion (in 20 μL) with accurately known concentration of 35 (0.392 g, 0.001 mol) in 500 μL of sodium acetate buffer (pH=7) solution. Complexation of metal to 35 was determined by Instant Thin Layer Chromatography (ITLC), by loading 2 μL of the final solution onto an ITLC silica strip and placing it into a running buffer consisting of sodium acetate (pH 4.5, 0.1 M) and ethanol in a 9:1 ratio. Each ITLC strip was dried and cut into ten equal portions. Radioactivity associate with each portion was determined using a Perkin-Elmer Wizard 3" 1480 Automatic Gamma Counter. The free metal ion moved with the solvent front and had a $R_f$ of 1.0. The metal complex remained at the origin with an $R_f$ of 0.0. The percent complexation was determined by the ratio of activity at the origin divided by total radioactivity on ITLC multiplied by 100.

7.2 Binding Studies to Latex 38 and 39

Metal binding experiments with $Co^{2+}$ and $Hg^{2+}$ metal ion solution doped with Co-57 and Hg-197/Hg-203, respectively, in the presence of 38 and 39 were undertaken (10 minutes, RT; 1 hour 40° C., respectively). The competitive binding experiments were carried out using equal to higher molar ratios of each metal ion. The radioactive emissions characteristic for each radioisotope was used to correlate radioactivity in solution to the concentration of respective metal ion (natural isotope) in solution. This approach allows accurate detection of metal ions in solution and thus quantitative information on binding efficiencies of each metal to the nanoparticle. The results (FIG. 5) under these conditions show the selective binding of 38 (>70%) with Hg-203.

7.3 The Effects of Temperature, Time and pH on Binding

The effect of temperature, time and pH were investigated for each metal ion with the respective ligands system. Optimum conditions for each metal ion is given in Table 5 below.

TABLE 5

| Metal Ion | Temperature | Incubation time |
|---|---|---|
| Co-57 | Room temperature | 10 minutes |
| Pb-201 | 40° C. | 1 hour |
| Hg-197/Hg-203 | 40° C. | 1 hour |

A typical assay involved incubating 20 μL metal ion solution (e.g. Co-57/$Co^{2+}$ ion) and 20 μL nanoparticles in 500 μL of sodium acetate buffer (0.1 M, pH 7). Each sample was incubated for its optimum time (in the case of $Co^{2+}$, at 10 min at room temperature), and then centrifuged on an Eppendorf centrifuge to free the supernatant of nanoparticles (typically 10 min at 13900 rpm). The supernatant was then divided into three equal aliquots (150 μL each) and associated radioactivity counted using a Perkin-Elmer Wizard 3" 1480 Automatic Gamma Counter for 10 s. Where nanoparticles where incubated with mixed radiotracers solution, appropriate gamma emissions for isolated and counted on the gamma counter. Samples were prepared in triplicate, and the amount of metal bound was calculated from these readings by taking the average counts for the supernatant, calculating for the total reaction volume, dividing by the standard counts for the same volume (% free) and subtracting from 100 (% bound). The binding efficiency was also determined over a range of pHs. It should be noted that in the pH range studied there was no coagulation of the polymer nanoparticles.

7.4 Competitive Binding Assays Against Co-57

To determine the effectiveness and or selectivity of nanoparticle 39 at metal complexation, a series of metal complexation assays similar to that described above (Example 3.2), were conducted in the presence of four carrier metal ions. The competition metal ions used in this study were $Cd^{2+}$, $Hg^{2+}$, $Pb^{2+}$ and $Co^{2+}$ as nitrate salts. Concentration of each competing metal ion ranged from 1×, 10×, 100× and 1000× higher than the $Co^{2+}$ concentration (0.0261 μM) in final solution. Co-57 was used to correlate concentration of $Co^{2+}$ to radioactivity in solution. Typically 20 μL aliquots of each competing metal ion was added to a 20 μL of Co-57/$Co^{2+}$ solution, followed by the addition of 20 μL of nanoparticles in 500 μL of bis-tris propane buffer (pH 8). The final reaction mixtures were rotated on rotor for fixed time period then centrifuged and the supernatant samples for radioactivity. Percentage of Co-57 bound to nanoparticles can correlated to concentration of $Co^{2+}$ in solution. The results are displayed in FIG. 6.

Example 8

Analytical Methodologies

8.1 $^1$H and $^{13}$C Nuclear Magnetic Resonance (NMR)

All NMR spectra were recorded on a Bruker DRX 500 MHz spectrometer using an external lock ($D_2O$, $CDCl_3$) and utilizing a standard internal reference (1,4-dioxane, solvent reference). $^{13}$C NMR spectra were recorded by decoupling the protons and all chemical shifts are given as positive downfield relative to these internal references.

8.2 Dynamic Light Scattering (DLS)

The average diameters of the nanoparticles were measured using a Malvern Zetasizer 3000HS. The sample refractive index (RI) was set at 1.59 for PSTY. The dispersant RI and viscosity were set to 1.33 and 0.89 Ns/$m^2$ respectively. The number average particle diameter was measured for each sample to determine each diameter and from this the number of particles per unit volume in solution ($N_c$) were calculated.

8.3 Size Exclusion Chromatography (SEC)

The molecular weight distributions of nanoparticles were measured by SEC. All polymer samples were dried prior to analysis in a vacuum oven for two days at 40° C. The dried polymer was dissolved in tetrahydrofuran (THF) (Labscan, 99%) to a concentration of 1 mg/mL. This solution was then filtered through a 0.45 μm PTFE syringe filter. Analysis of the molecular weight distributions of the polymer nanoparticles was accomplished by using a Waters 2690 Separations Module, fitted with two Ultrastyragel linear columns (7.8×300 mm) kept in series. These columns were held at a constant temperature of 35° C. for all analyses. The columns used separate polymers in the molecular weight range of 500-2 million g/mol with high resolution. THF was the eluent used at a flow rate of 1.0 mL/min. Calibration was carried out using narrow molecular weight PSTY standards (PDI≤1.1) ranging from 500-2 million g/mol. Data acquisition was performed using Waters Millenium software (ver. 3.05.01) and molecular weights were calculated by using a $5^{th}$ order polynomial calibration curve.

8.4 X-Ray Photoelectron Spectroscopy (XPS)

XPS was used to determine whether 1 was covalently attached to the surface of the nanoparticles. The latex consisting of the nanoparticles was cast onto a glass plate, and dried under vacuum for 2 days at room temperature. Data was acquired using a Kratos Axis ULTRA X-ray Photoelectron Spectrometer incorporating a 165 mm hemispherical electron energy analyser. The incident radiation was Monochromatic Al X-rays (1486.6 eV) at 150 W (15 kV, 10 mA). Survey (wide) scans were taken at analyser pass energy of 160 eV and multiplex (narrow) high resolution scans at 20 eV. These scans were carried out over 1200-0 eV binding energy range with 1.0 eV steps and a dwell time of 100 ms. Narrow high-resolution scans were run with 0.1 eV steps and 250 ms dwell time. All samples were dried in a vacuum oven prior to insertion into the instrument and, once inside, remained in a vacuum overnight to ensure that no water or solvent molecules remained. SEM showed that the film consisted of a coagulation of polymer particles, in which there was little or no polymer mixing between particles. This shows that the XPS measures the surface atoms and not the bulk of the nanoparticles. See FIG. 7.

8.5 Scanning Electron Microscopy (SEM)

The films from above were also characterised by SEM on a Jeol 6300 and the Jeol 890 SEM instruments. All samples (unless stated otherwise), were sputter coated with Pt(s) at a thickness of 15 nm. The 6300 was used to look at polymer nanoparticles using an electron beam at 5 kV and 8 mm aperture, while the 890 was used for observing the thin film packing of the polymer nanoparticles using an electron beam a 2 kV. See FIG. 8.

Example 9

Development of a Metallophyte Database

A metallophyte database covering Australia has been initiated to centralise, manage and facilitate access to existing and new information on native plant species tolerant to metals and metalloids. Heavy metals and metalloids captured in the database include: Ag, As, Au, Cd, Co, Cr, Cu, Fe, Mn, Mo, Ni, Pb, Sb, Se and Zn. Information on soil/substrate characteristics (pH, electrical conductivity, total and bioavailable metal content), habitat descriptions and images of metallophytes, and electronic versions of published papers are also included in the database. The metallophyte database has also been linked to *Phoenix*, a 3-D GIS program which allows the user to visualise the results of database queries on an aerial photo covering the whole of Australia and to extract information such as metal concentration values. A *Phoenix* Screen Shot in FIG. 9 shows an aerial photo of Australia in the map window on the left and information attached to a metallophyte sampler on the control panel window on the right. The selected metallophyte sampler has a pdf document, a relational database attribute and four photos attached to it.

DRAWINGS

Various embodiments/aspects of the invention are described with reference to the following drawings in which.

Figure 1A:
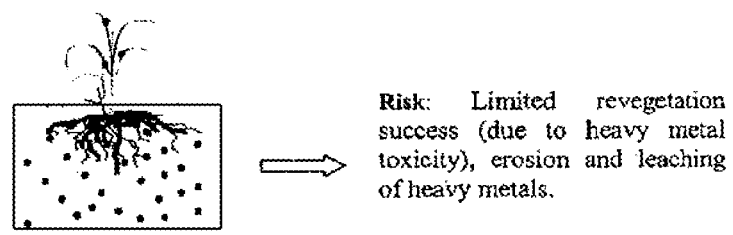
FIG. 1 is a drawing depicting the combination of nanotechnology with phytoremediation for a novel approach to land rehabilitation.
Figure 1B:
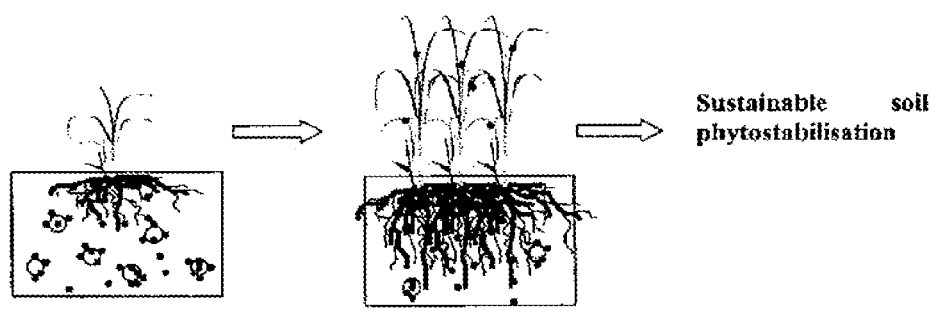

FIG. 1(*a*) depicts traditional rehabilitation using phytoremediation wherein rehabilitation is of limited success due to the amount of heavy metal remaining in the site soil which contributes to the risk of the heavy metals entering the environment as a result of wind and surface erosion and/or water leaching. FIG. 1(*b*) depicts rehabilitation according to the present invention using combined hydrogel technology and phytoremediation-hydrogel particles bind irreversibly to heavy metals in the site soil, decreasing the metal bioavailability to plants, and releasing water during drought periods and allowing revegetation to proceed. The particles degrade over time releasing the heavy metals, which are thus diluted in the plant root biomass including bacteria and bound by soil organic matter, thus leading to sustainable soil phytostabilisation.

Figure 2:
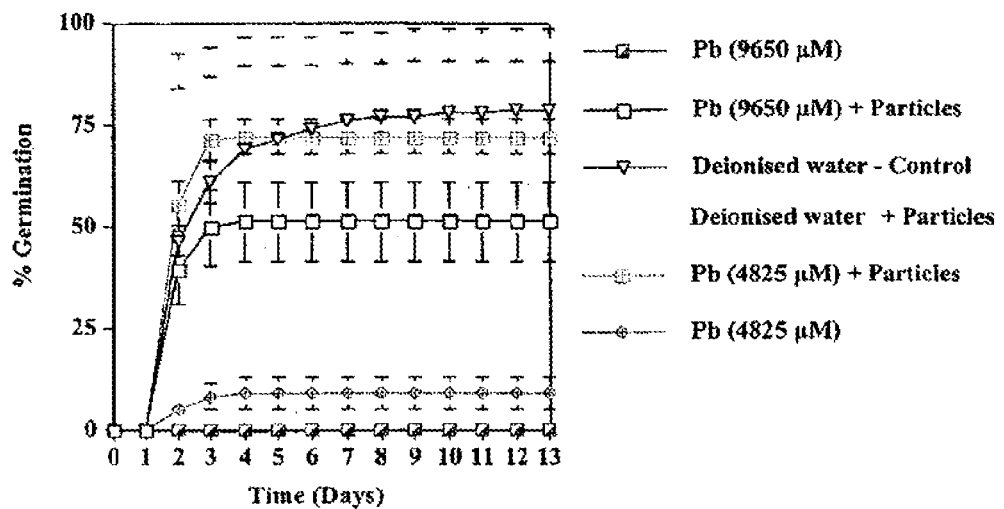
FIG. 2 is a plot of the germination percentage of *Astrebla lappacea* as a function of time in the presence of toxic concentrations of lead with or without addition of particles.

FIG. 2 is a plot of the germination percentage of *Astrebla lappacea* as a function of time in the presence of toxic concentrations of lead with or without addition of particles. Control seeds were germinated using sterile deionised water. Vertical bars when larger than the symbol indicate ±SE of the mean for n=5.

Figure 3:
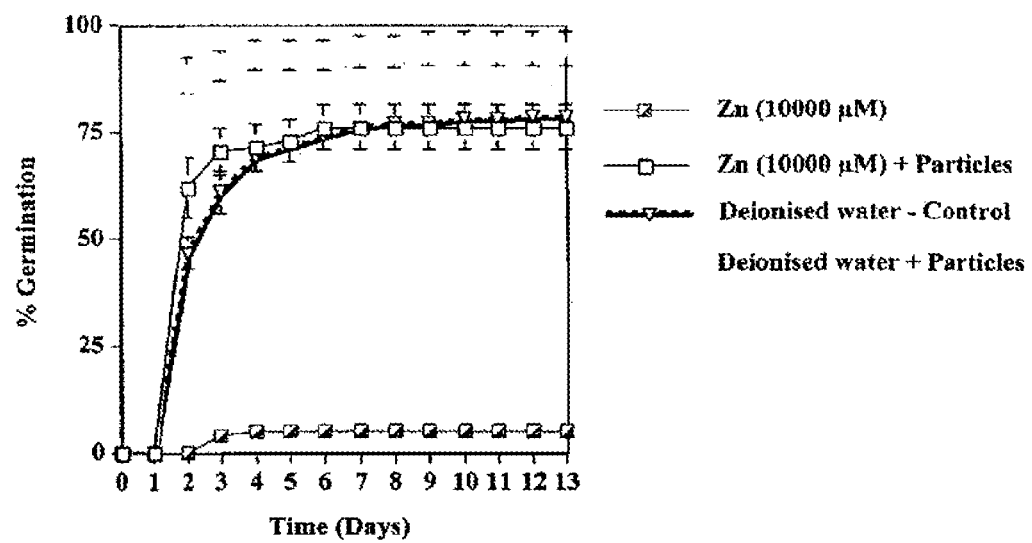
FIG. 3 is a plot of germination percentage of *Astrebla lappacea* as a function of time in the presence of toxic concentration of zinc with or without addition of particles.

FIG. 3 is a plot of the Germination percentage of *Astrebla lappacea* as a function of time in the presence of toxic concentration of zinc with or without addition of particles. Control seeds were germinated using sterile deionised water. Vertical bars when large enough indicate ±SE of the mean for n=5.

Figure 4:
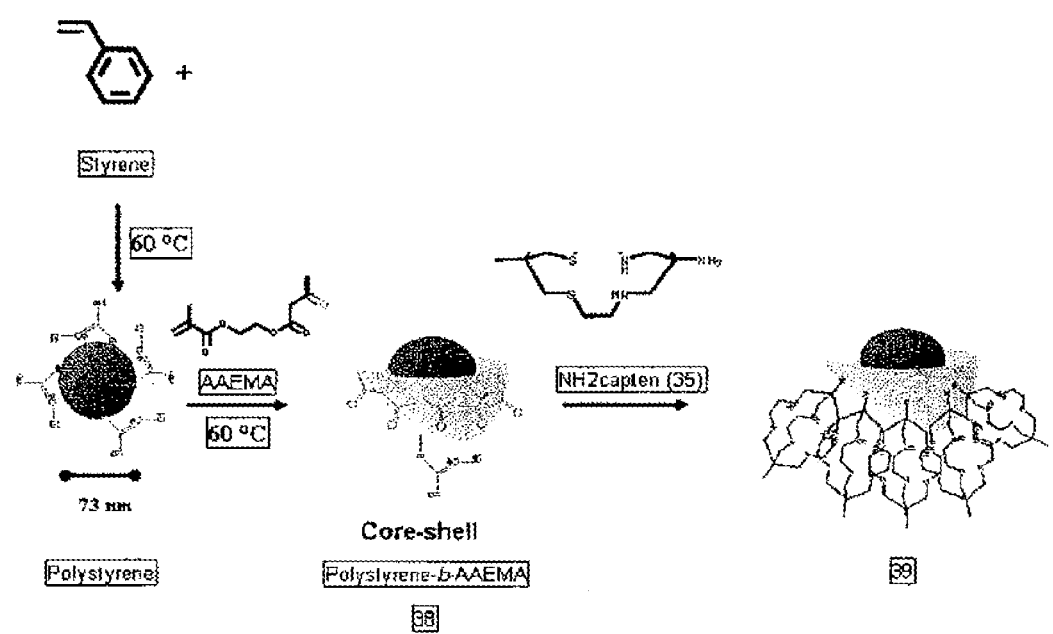
FIG. 4 is a depiction of a synthetic procedure for the preparation of core-shell nanopolymer particles suitable for use in the process of the present invention.

FIG. 4 depicts a synthetic procedure for the preparation of core-shell nanopolymer particles suitable for use in the process of the present invention with surface functionality made by the RAFT process. (i) Ab inito emulsion polymerisation of styrene in the presence of xanthate, 36, (ii) block copolymerization of AAEMA to form a core-shell nanoparticle (38), and (iii) coupling of the macrobicyclic ligand, 35, onto the nanoparticles (39). The transmission electron microscopy (cryo-TEM) image provides strong evidence that this method does produce core-shell morphologies.

Figure 5:
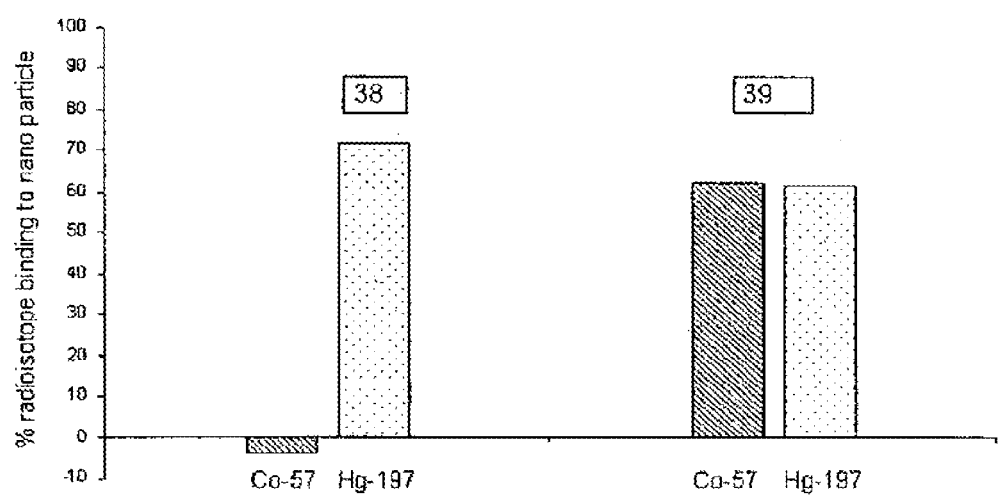
FIG. 5 is a plot depicting the uptake of Co-57 and Hg-197/Hg-203 in the presence of 38 and 39.

FIG. 5 is a plot depicting the uptake of Co-57 and Hg-197/Hg-203 in the presence of 38 and 39 (10 minutes, RT; 1 hour, 40° C., respectively; [Co]=0.967 nM, [Hg]=5.423 µM).

Figure 6:
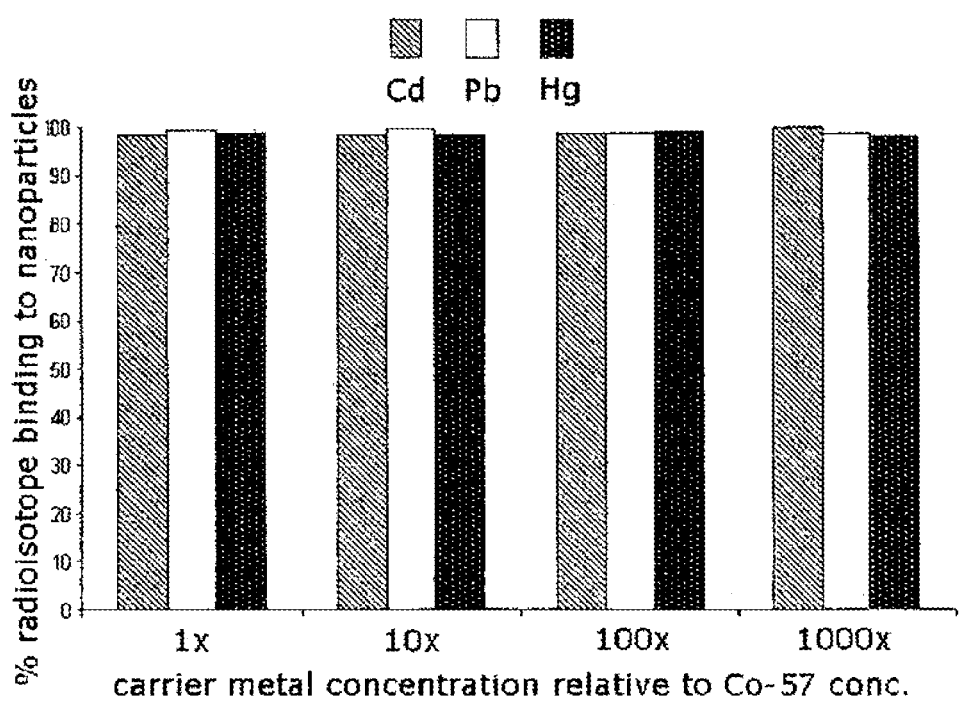
FIG. 6 is a plot depicting the results of competitive binding experiments for Co-57 with increasing concentrations

FIG. 6 is a plot depicting the results of competitive binding experiments for Co-57 with increasing concentrations (1, 10, 100, 1000 fold excess) of non-radioisotope carrier metals (Cd(II), Pb(II) and Hg(II)) (10 min, RT; 1×, [Co, Cd, Pb, Hg]=0.9321 nM; 10×, [Co]=0.9321 nM, [Cd, Pb, Hg]=9.321 nM; 100×, [Co]=0.9321 nM, [Cd, Pb, Hg]=93.21 nM; 1000×, [Co]=0.9321 nM, [Cd, Pb, Hg]932.1 nM).

Figure 7A:
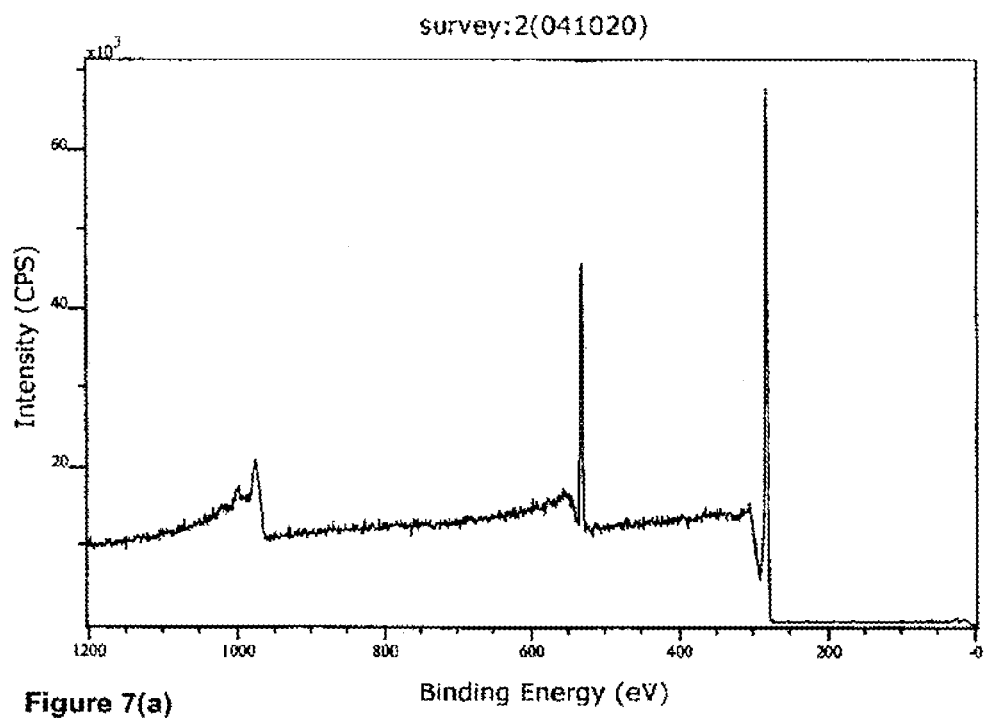
FIG. 7 is an X-ray photoelectron spectroscopy (XPS) analysis of polymeric nanoparticles; 38 (top) and 39 (bottom).
Figure 7B:
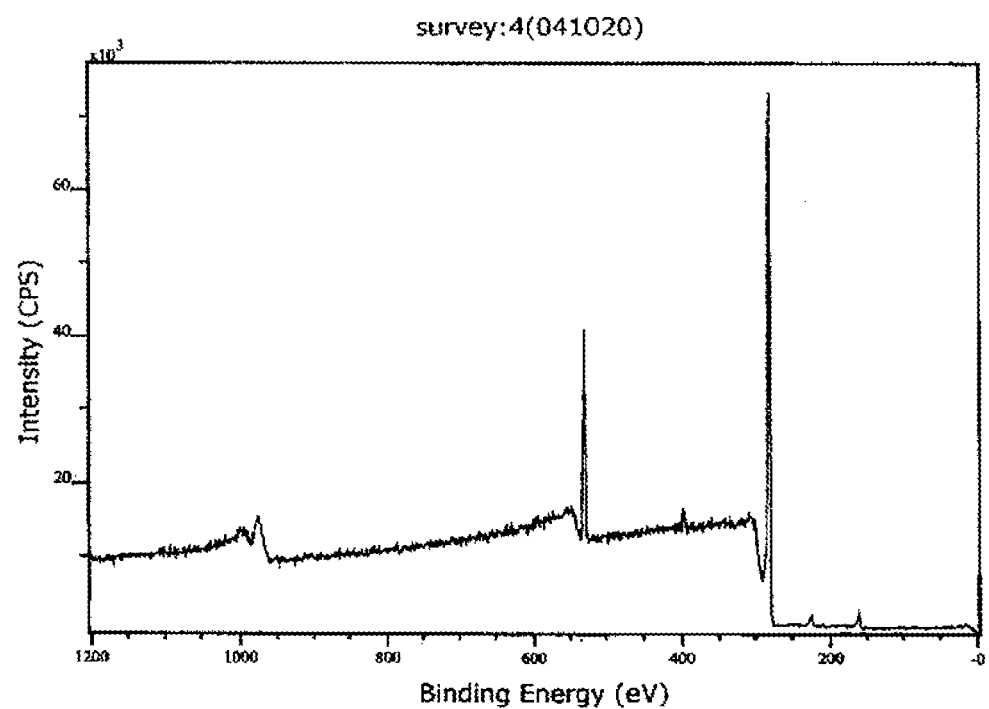

FIG. 7 is an X-ray photoelectron spectroscopy (XPS) analysis of polymeric nanoparticles; 38 (FIGS. 7(*a*)) and 39 (FIG. 7(*b*)).

Figure 8:
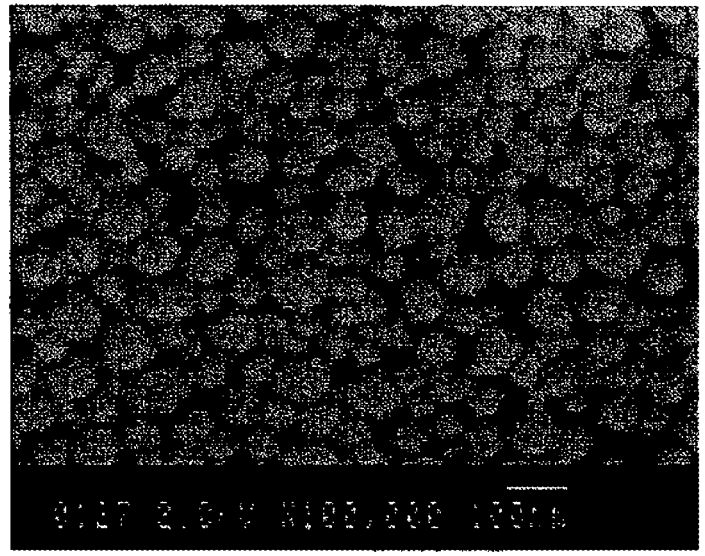
FIG. 8 is a scanning electron microscopy (SEM) image of nanoparticles 39 dried on a glass plate.

FIG. 8 is an SEM image of nanoparticles 39 dried on a glass plate.

Figure 9:
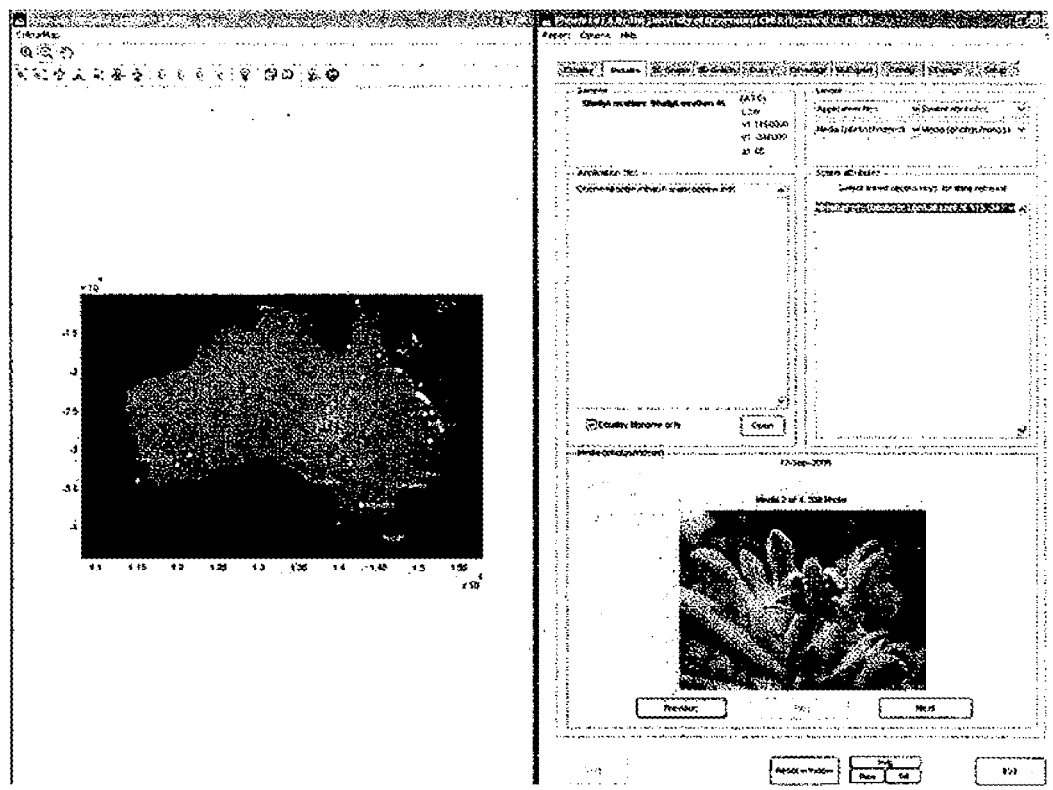
FIG. 9 is a Phoenix Screen Shot showing an aerial photo of Australia in the map window on the left and information attached to a metallophyte sampler on the control panel window on the right.

FIG. 9 is a *Phoenix* Screen Shot showing an aerial photo of Australia in the map window on the left and information attached to a metallophyte sampler on the control panel window on the right.

REFERENCES

Baker A J M, 1981. Journal of Plant Nutrition. 3: 643-654.
Banfield, J. F. & Zhang, H. (2001). 'Nanoparticles in the Environment', in
Banfield, J F & Navrotsky, A (eds.), Nanoparticles and the Environment, Mineralogical Society of America 44: 1-58.
Barvenik F W, 1994. *Soil Science*. 158: 235-43.
Bell C A S et al., 2006. *Advanced Materials*. 18: 582-586.
Bell, C. A., Smith, S. V., Whittaker, M. R., Whittaker, A. K., Gahan, L. R. & Monterio, M. J. (2006). 'Surface-Functionalized Polyer Nanoparticles for Selective Sequestering of Heavy Metals', *Advanced Material* 18: 582-586.
Bicerano, J. (1994). Predicting key polymer properties to reduce erosion in irrigated soil. *Soil Science* 158 255-266.
Blaylock, 2000. In Terry N, Banuelos G, eds. Phytoremediation of Contaminated Soil and Water. Boca Raton, Fla.: Lewis Publ. pp 1-12.
Commonwealth Scientific and Industrial Research Organisation (CSIRO) Sustainability Network, 2004. Network letter 46E. Australia. 24 p.
Charmot, D., et al, WO 9858974;

Charmot, D., et al, *Decehme Monographien* 1992, 127, 483

Dahmani-Muller H et al., 2001. *Environmental Pollution.* 114: 77-84.

Ebbs S D, Kochian L V, 1997. *Journal of Environmental Quality.* 26: 776-781.

Fryxwell, G. E. & Mattigod, S. V. (2006). 'Nanomaterials for Environmental Remediation', in Kumar, C (ed), Nanomaterials—Toxicity, Health and Environmental Issues, pp. 189-210.

Ghosh M, Singh S P, 2005. *Applied Ecology and Environmental Research.* 3: 1-18.

Huang J W et al., 1997. *Environmental Science & Technology.* 31: 800-805.

JuranicovaV et al., 1998. *Angewandte Makromolekulare Chemie.* 258: 27-31.

Kara A et al., 2004. *Journal of Hazardous Materials.* 106: 93-99.

Kesenci K et al., 2002. *European Polymer Journal.* 38: 1443-1448.

Khan A G, 2001. *Environment International.* 26: 417-423.

Kirkpatrick W D et al., 2006.

Lasat M M, 2000. *Journal of Hazardous Substance Research.* 2: 1-23.

Massoura S T et al., 2004. *Australian Journal of Soil Research.* 42: 933-938.

Mathur A M et al., 1996. *Journal of Macromolecular Science, Reviews in Macromolecular Chemistry and Physics.* C36: 405-30.

McGrath S P et al., 2002. *Advanced Agronomy.* 75: 1-56.

Nadler, A., Magaritz, M., abd Leib, L. (1994) PAM application techniques and mobility in soil. *Soil Science* 158:249-254.

Prasad M N V, Freitas H M D O, 2003. *Electronic Journal of Biotechnology.* 6: 285-321.

Qiao X L, Luo Y M, 2001. *Soils.* 33: 222-224.

Saleh N et al., 2005. *Nano letters.* 5: 2489-94.

Say R et al., 2002a. *Macromolecular Materials and Engineering.* 287: 539-545.

Say R et al., 2002b. *Physicochemical and Engineering Aspects.* 196: 199-207.

Szwarc, *Nature,* 1956, 178, 1168-1169

Tordoff G M et al., 2000. *Chemosphere* 41: 219-228.

Tu C et al., 2000. *Acta Pedologica Sinica.* 37: 284-287.

Tungittiplakorn W et al., 2004. *Environmental Science and Technology.* 38: 1605-1610.

Tungittiplakorn W et al., 2005. *Environmental Science and Technology.* 39: 1354-1358.

Uzun L et al., 2006. *Journal of Applied Polymer Science.* 102: 4276-4283.

Wiersma, D., Van Goor, B. J., Van der Veen, N. G, (1986). Cadmium, lead, mercury and arsenic concentrations in crops and corresponding soils in the Netherlands. *J Agric Food Chem* 34: 1067-1074.

Whiting S N et al., 2001. *Environmental Science and Technology.* 35: 3237-3241.

Wilson M K et al., 2002. *Nanotechnology: Basic Science and Emerging Technologies.* New York, N.Y., Chapman & Hall/CRC.

Wu L H et al., 2004. *Environmental Geochemistry and Health.* 26: 331-335.

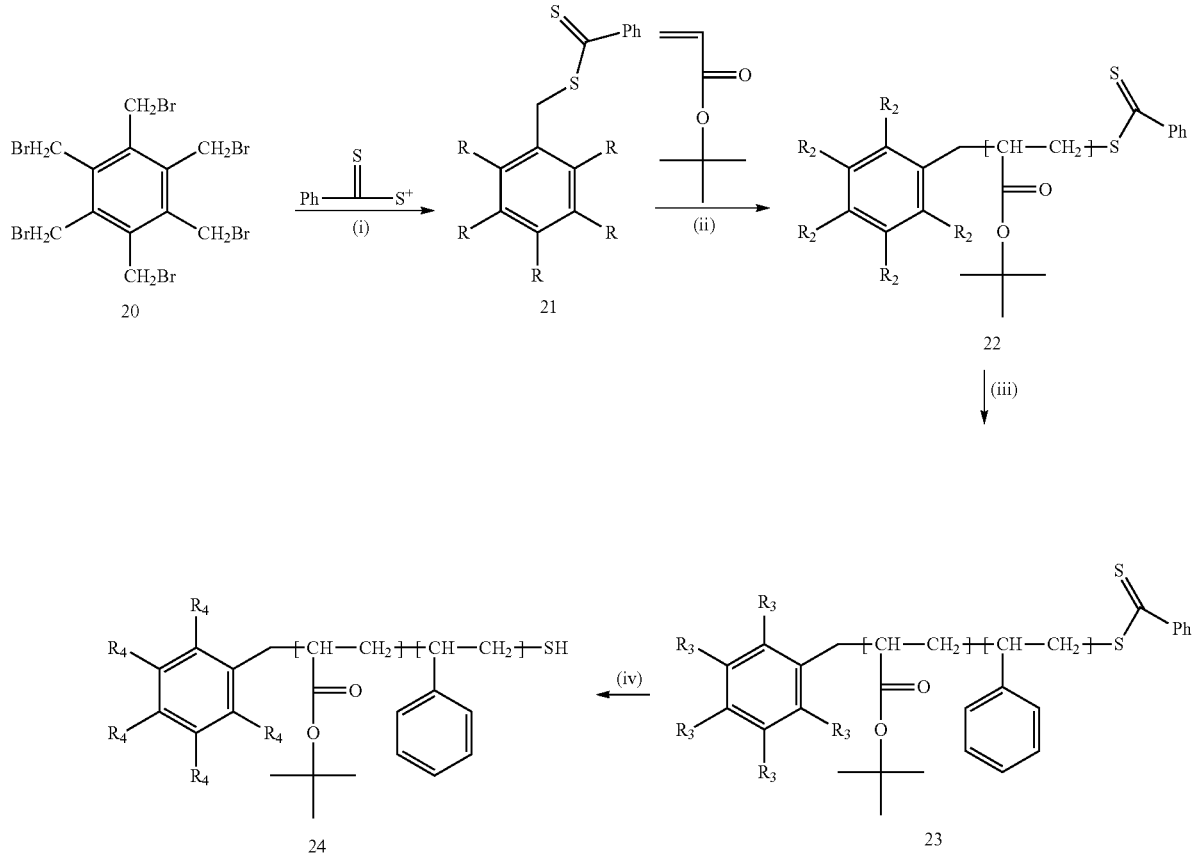

Scheme 1

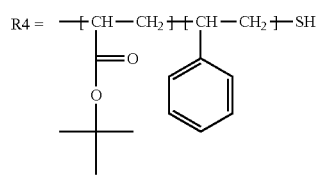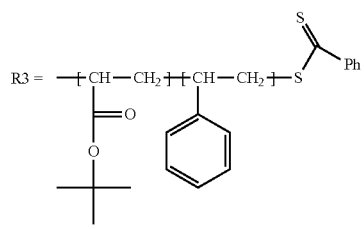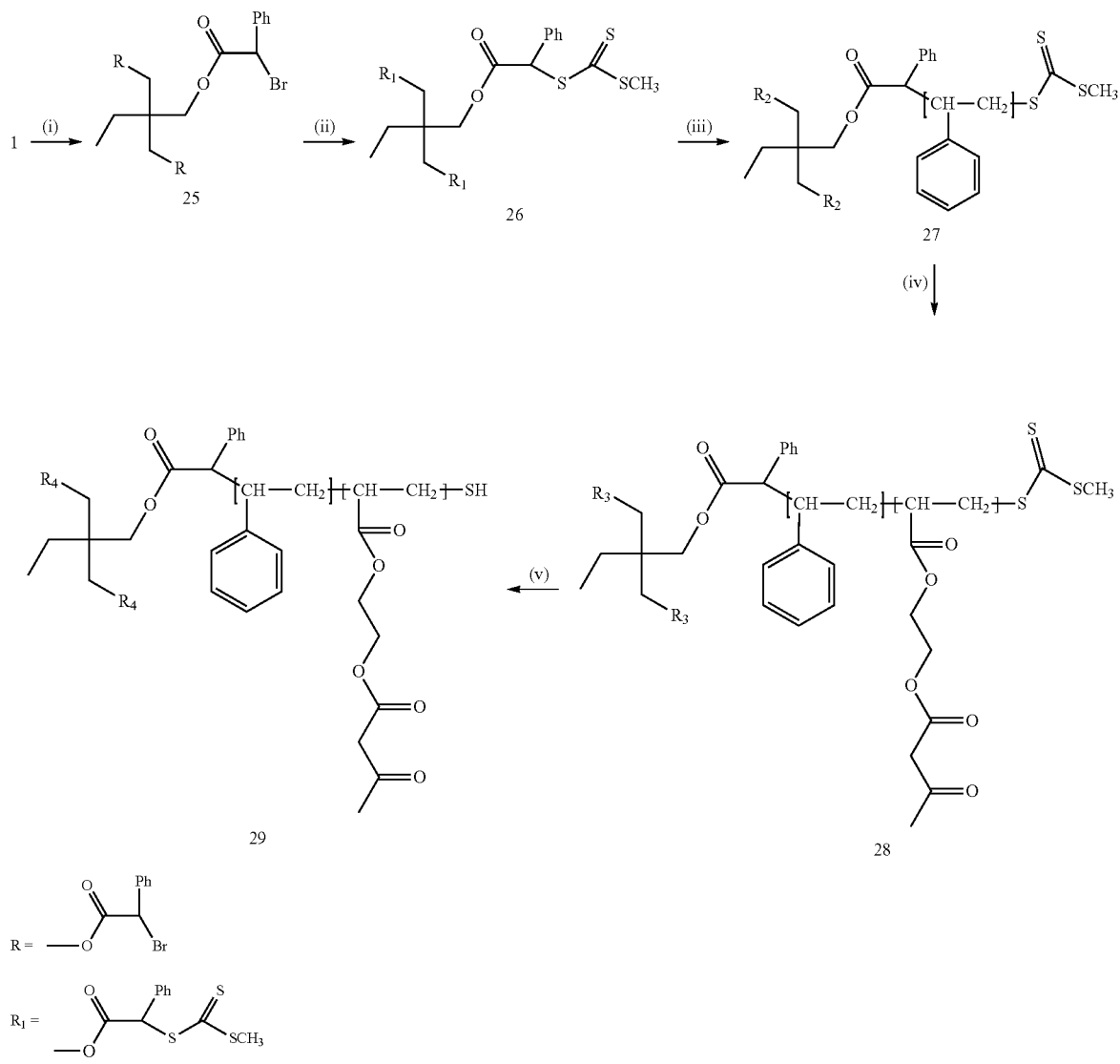

-continued
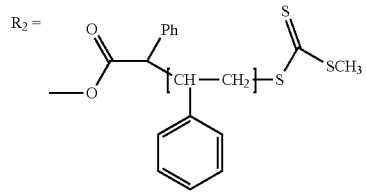
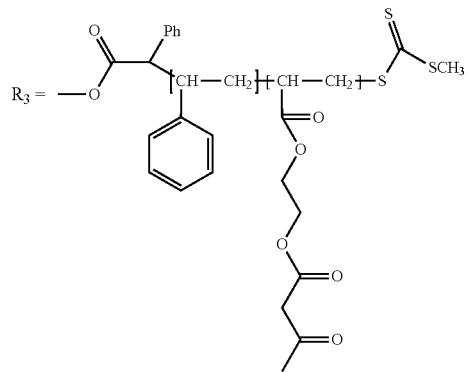
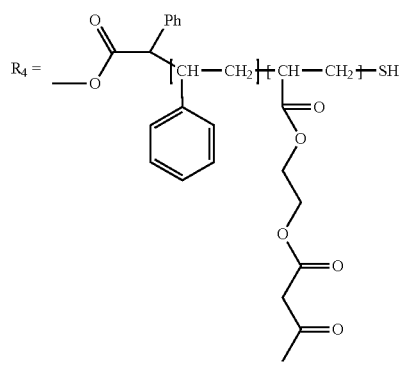
Scheme 3
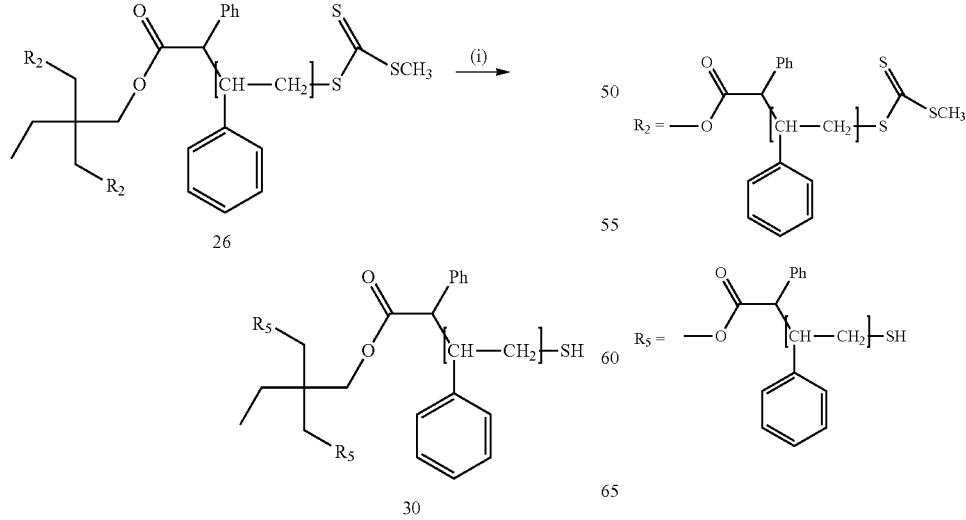

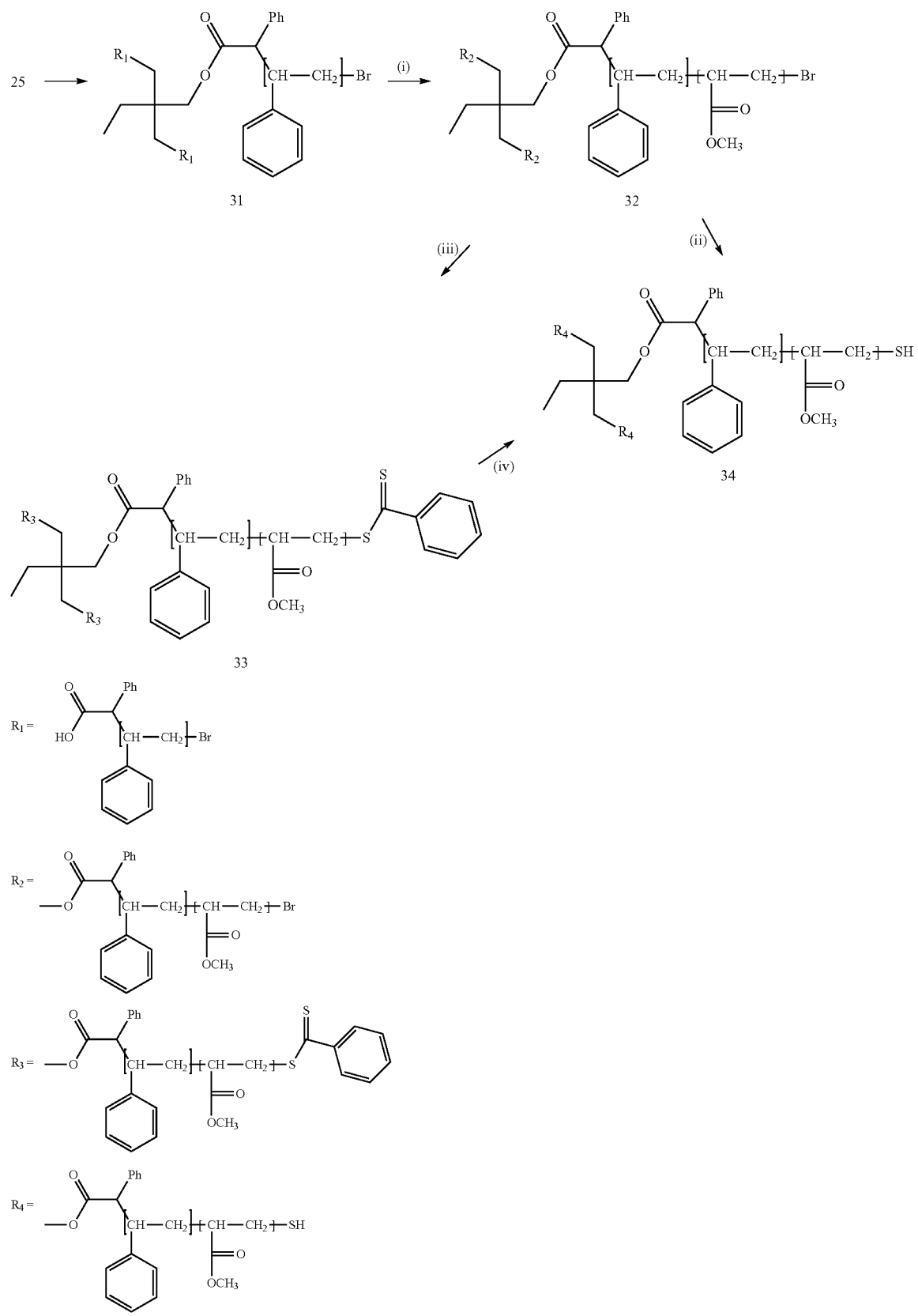

The claims defining the invention are as follows:

1. A process for site remediation comprising the steps of:
   (a) adding metal-binding particles to a site containing one or more metal contaminants such that at least some of the metal contaminants are sequestered by the particles, and
   (b) populating the site with plants,
   wherein the metal-binding particles are comprised of a polymer having a surface that comprises pendant sulphur-containing moieties $M^1$ that are capable of binding a metal to form a complex comprising the polymer and the metal.

2. The process according to claim 1 wherein the pendant moieties $M^1$ are selected from the group consisting of thioketones, thiocarbonates, dithiocarbonates, trithiocarbonates, thioesters, dithioates, thioates, oxythiocarbonyl and thiocarbonyloxy derivatives, thiocarbamates, dithiocarbamates, sulphides, thiols, thioethers, disulphides, hydrogendisulphides, mono- or di-thioacetals, mono- or dithiohemiacetals, thioamides, thioimides, imidothioates, thioguanidines, dithioguanidines, thiocyanates, isothiocyanates, sulphur containing macrocycles and substituted sulphur containing heterocycles.

3. The process according to claim 1 wherein the pendant moieties $M^1$ are present as part of a heterocyclic or carbocyclic ring.

4. The process according to claim 1 wherein the sulphur-containing moiety $M^1$ may be present as a substituent of a carbocyclic or heterocyclic ring.

5. The process according to claim 1 wherein the sulphur-containing surface-pendant heavy metal binding moiety $M^1$ is selected from Formula I:

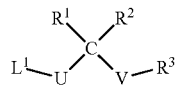

wherein:
$L^1$ is a linking group to the polymer;
U is absent or present and is oxygen, sulphur or $-NR^4-$;
V is absent or present and is selected from H, oxygen, sulphur or $-NR^4-$; and
C is absent or present and represents a carbon atom, provided that C is only absent when both U and V are sulphur or when V is hydrogen;
$R^1$ and $R^2$ are independently selected from hydrogen, cyano, halo, hydroxy, $C_{1-6}$alkoxy, $C_{1-6}$acyloxy, mercapto, amino, nitrile, nitro, nitroso, optionally substituted $C_{1-8}$alkyl, optionally substituted $C_{1-8}$alkenyl, optionally substituted $C_{1-8}$alkynyl, optionally substituted $C_{1-4}$alkylaryl, and optionally substituted aryl;
$R^1$ and $R^2$ combine with C to form C=S, C=N-$R^N$, or C=O, wherein $R^N$ is hydrogen, hydroxy, amino, optionally substituted $C_{1-8}$alkyl, optionally substituted $C_{1-8}$alkenyl, optionally substituted $C_{1-8}$alkynyl, optionally substituted $C_{1-4}$alkylaryl, and optionally substituted aryl; or
$R^1$ and $R^2$ combine to form an optionally substituted 1,3-dithiane or 1,3 dithiolane;
$R^3$ is absent when V is a hydrogen atom and is selected from hydrogen, optionally substituted $C_{1-8}$alkyl, optionally substituted $C_{2-8}$alkenyl, optionally substituted $C_{2-8}$alkynyl, optionally substituted $C_{1-4}$alkylaryl, optionally substituted heterocycloalkyl, optionally substituted heteroaryl and optionally substituted aryl; and $R^4$ is selected from hydrogen, hydroxy, amino, optionally substituted $C_{1-8}$alkyl, optionally substituted $C_{1-8}$alkenyl, optionally substituted $C_{1-8}$alkynyl, optionally substituted $C_{1-4}$alkylaryl, and optionally substituted aryl;
provided that at least one of U, V or the combination of $R^1$ and $R^2$ contains a sulphur atom.

6. The process according to claim 5 wherein the linking group $L^1$ is of Formula II:

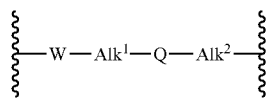

wherein:
W is absent or present and is selected from >$NR^G$, $-NHC(O)-$, $-C(O)NH-$, $-S-$, or $-O-$, wherein $R^G$ is hydrogen, optionally substituted $C_{1-6}$alkyl, optionally substituted aryl$C_{1-4}$alkyl, optionally substituted aryl or optionally substituted heteroaryl;

Alk$^1$ is absent or present and is selected from an optionally substituted divalent $C_{1-4}$alkyl, optionally substituted divalent $C_{2-5}$alkenyl and optionally substituted divalent $C_{2-5}$alkynyl chain, optionally substituted divalent aryl, optionally substituted divalent heteroaryl, optionally substituted divalent $C_{1-4}$alkylaryl, and optionally substituted divalent aryl$C_{1-4}$alkyl, with the proviso that both W and Q are not simultaneously present when Alk$^1$ is absent;

Alk$^2$ is absent or present and is selected from optionally substituted divalent $C_{1-4}$alkyl, optionally substituted divalent $C_{2-5}$alkenyl, optionally substituted divalent $C_{2-5}$alkynyl chain, optionally substituted divalent aryl, optionally substituted divalent heteroaryl, optionally substituted divalent $C_{1-4}$alkylaryl, and optionally substituted divalent aryl$C_{1-4}$alkyl;

Q is absent or present and is selected from $-NH-$, $-O-$, $-S-$, $-NHC(O)-$, $-C(O)NH-$, NHSO$_2-$, $-C(R^G)=N-N-$, $-NHC(O)NH-$, $-NHC(S)NH-$, $-C(R^G)=N-$, and $-N=C(R^G)-$; and when all of Alk$^1$, Alk$^2$, W, and Q are absent, $L^1$ is a covalent linkage.

7. The process according to claim 1 wherein the pendant sulphur-containing moiety $M^1$ is selected from:

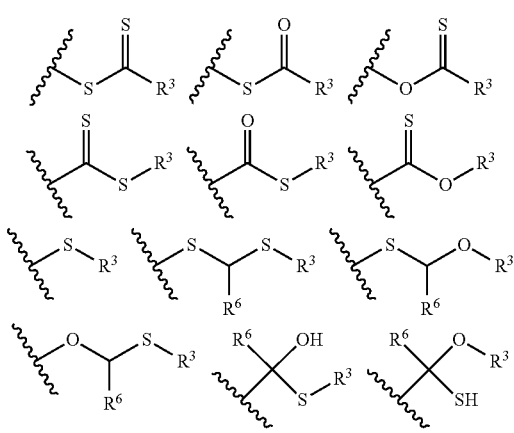

-continued

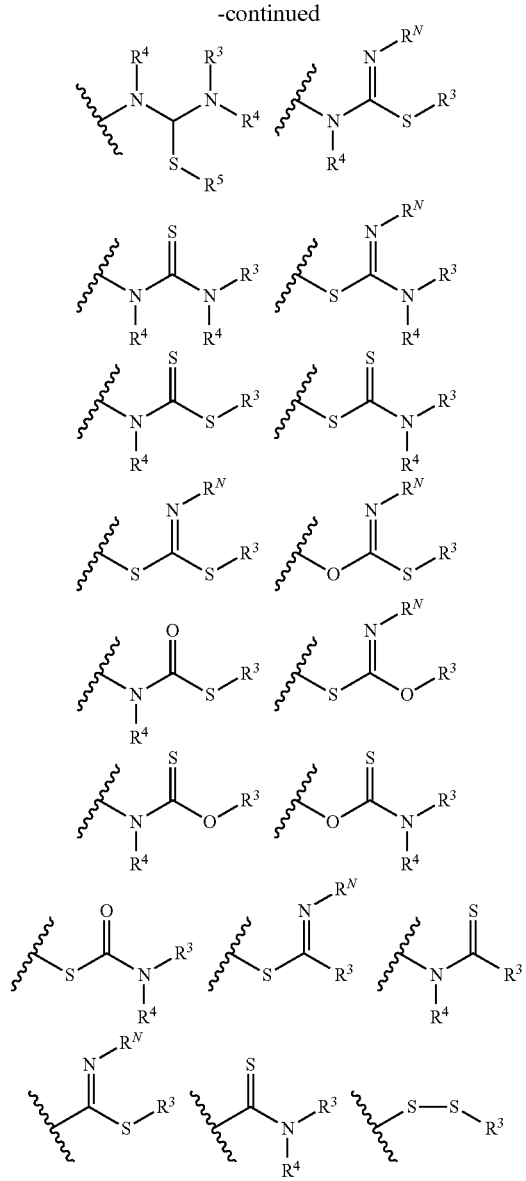

wherein
R$^N$ is hydrogen, hydroxy, amino, optionally substituted C$_{1-8}$alkyl, optionally substituted C$_{1-8}$alkenyl, optionally substituted C$_{1-8}$alkynyl, optionally substituted C$_{1-4}$alkylaryl, and optionally substituted aryl;
R$^3$ is a hydrogen atom and is selected from hydrogen, optionally substituted C$_{1-8}$alkyl, optionally substituted C$_{2-8}$alkenyl, optionally substituted C$_{2-8}$alkynyl, optionally substituted C$_{1-4}$alkylaryl, optionally substituted heterocycloalkyl, optionally substituted heteroaryl and optionally substituted aryl; and R$^4$ is selected from hydrogen, hydroxy, amino, optionally substituted C$_{1-8}$alkyl optionally substituted C$_{1-8}$alkenyl, optionally substituted C$_{1-8}$alkynyl, optionally substituted C$_{1-4}$alkylaryl, and optionally substituted aryl;
R$^5$ is the same as R$^3$; and
R$^6$ is selected from hydrogen, cyano, halo, hydroxy, C$_{1-6}$alkoxy, C$_{1-6}$acyloxy, mercapto, amino, nitrile, nitro, nitroso, optionally substituted C$_{1-8}$alkyl, optionally substituted C$_{1-8}$alkenyl, optionally substituted C$_{1-8}$alkynyl, optionally substituted C$_{1-4}$alkylaryl, and optionally substituted aryl.

8. The process according to claim 1 wherein the sulphur-containing surface-pendant heavy metal binding moieties M$^1$ are of formula IIa:

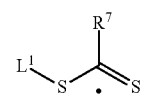

wherein:
L$^1$ is a linking group to the polymer:
S represent a sulphur atom;
R$^7$ is selected from halo, C$_{1-6}$alkyl, C$_{1-6}$alkoxy, optionally substituted aryl, and optionally substituted C$_{1-4}$alkylaryl.

9. The process according to claim 1 wherein the polymer surface comprises a carbonyl-containing moiety M$^2$.

10. The process according to claim 9 wherein M$^2$ is chosen from the group comprising heterocyclic rings, carbocyclic ring systems, ketones, di and tri-ketones, hydroxy-ketones, vinyl ketones, esters, keto-esters including β-ketoesters, aldehydes, carbonates, anhydrides, carbamates, amides, imides (diacylamines), triacylamides, hydrazides, isocyanates and ureas.

11. The process according to claim 9 wherein M$^2$ is present as a substituent of a carbocyclic or heterocyclic ring.

12. The process according to claim 1 wherein the polymer surface comprises one or more heavy metal-binding moieties M$^1$ wherein at least one heavy metal binding moiety is selected from Formula III:

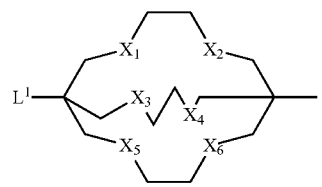

wherein X$_1$ to X$_6$ are independently selected from sulphur or —NH— provided that at least one of X$_1$ to X$_6$ is a sulphur atom; and
L$^1$ is a linking group to the polymer.

* * * * *